US012328628B2

(12) United States Patent
Wu et al.

(10) Patent No.: US 12,328,628 B2
(45) Date of Patent: Jun. 10, 2025

(54) CONFIGURATION HANDLING AT A USER DEVICE

(71) Applicant: GOOGLE LLC, Mountain View, CA (US)

(72) Inventors: Chih-Hsiang Wu, Taoyuan (TW); Ching-Jung Hsieh, Taipei (TW)

(73) Assignee: GOOGLE LLC, Mountain View, CA (US)

( * ) Notice: Subject to any disclaimer, the term of this patent is extended or adjusted under 35 U.S.C. 154(b) by 304 days.

(21) Appl. No.: 17/793,680

(22) PCT Filed: Jan. 19, 2021

(86) PCT No.: PCT/US2021/013924
§ 371 (c)(1),
(2) Date: Jul. 19, 2022

(87) PCT Pub. No.: WO2021/146697
PCT Pub. Date: Jul. 22, 2021

(65) Prior Publication Data
US 2023/0047744 A1    Feb. 16, 2023

Related U.S. Application Data

(60) Provisional application No. 62/963,148, filed on Jan. 19, 2020.

(51) Int. Cl.
*H04W 36/00* (2009.01)
(52) U.S. Cl.
CPC ... *H04W 36/0072* (2013.01); *H04W 36/0083* (2013.01); *H04W 36/00837* (2018.08); *H04W 36/00698* (2023.05)

(58) Field of Classification Search
CPC .... H04W 8/24; H04W 52/367; H04W 52/365
USPC .......................................................... 455/437
See application file for complete search history.

(56) References Cited

U.S. PATENT DOCUMENTS

2019/0281511 A1    9/2019 Susitaival et al.

OTHER PUBLICATIONS

NEC (source cell signaling during CHO execution, 3GPP draft; R2-1909142 (Year: 2019).*
Ericsson (Handling of a HO command while UE is monitoring CHO, Ericsson hereafter) (Year: 2019).*
International Search Report and Written Opinion for Application No. PCT/US2021/013924, dated May 3, 2021.
NEC, "Source Cell Signalling During CHO Execution," 3GPP Draft (2019).
Ericsson, "Handling of a HO Command while UE is Monitoring Cho," 3GPP Draft (2019).

(Continued)

Primary Examiner — Tanmay K Shah
(74) Attorney, Agent, or Firm — MARSHALL, GERSTEIN & BORUN LLP

(57) ABSTRACT

A radio access network (RAN) for configuring a user equipment (UE) transmits, to the UE, (i) a conditional configuration related to a base station operating in the RAN, and (ii) a condition to be satisfied before the UE applies the conditional configuration during a conditional procedure (1802), determines subsequently to the transmitting, that the UE is to perform an immediate procedure related to the RAN (1804), and provides, to the UE, an indication that the UE is to release the conditional configuration (1806).

20 Claims, 20 Drawing Sheets

(56) References Cited

OTHER PUBLICATIONS

Qualcomm Incorporation, "LTE Conditional HO Design Considerations," 3GPP Draft (2019).
CATT, "Conditional PSCell Addition/Change," 3GPP Draft (2019).
InterDigital Inc, "Details of Conditional Handover Procedure for LTE," 3GPP Draft (2019).

* cited by examiner

CONFIGURATION HANDLING AT A USER DEVICE

This disclosure relates generally to wireless communications and, more particularly, to managing configuration related to conditional procedures such as conditional handover, conditional secondary node addition, and conditional primary secondary cell addition procedures.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of the MN, the SN, or both the MN and the SN can be referred to as split DRBs.

The UE in some scenarios can concurrently utilize resources of multiple radio access network (RAN) nodes (e.g., base stations or components of a distributed base station), interconnected by a backhaul. When these network nodes support different radio access technologies (RATs), this type of connectivity is referred to as Multi-Radio Dual Connectivity (MR-DC). When a UE operates in MR-DC, one base station can operate as a master node (MN) that covers a primary cell (PCell), and the other base station can operate as a secondary node (SN) that covers a primary secondary cell (PSCell). The UE can communicate with the MN (via the PCell) and the SN (via the PSCell). In other scenarios, sometimes called single connectivity (SC), the UE can utilize resources of one base station at a time. One base station and/or the UE can determine that the UE should establish a radio connection with another base station. For example, one base station can determine to hand the UE over to the second base station, and initiate a handover procedure.

3GPP specification TS 37.340 (v15.7.0) describes procedures for a UE to add or change an SN or PSCell in DC scenarios. These procedures involve messaging (e.g., RRC signaling and preparation) between RAN nodes. This messaging generally causes latency, which in turn increases the probability that the SN (or PSCell) addition or SN (or PSCell) change procedure will fail. These procedures, which do not involve conditions that are checked at the UE, can be referred to as "immediate" SN (or PSCell) addition and "immediate" SN (or PSCell) change procedures.

UEs can also perform handover procedures to switch from one cell to another, whether in SC or DC operation. The UE may handover from a cell of a first base station to a cell of a second base station, or from a cell of a first distributed unit (DU) of a base station to a cell of a second DU of the same base station, depending on the scenario. 3GPP specifications 36.300 v15.6.0 and 38.300 v15.6.0 describe a handover procedure that includes several steps (RRC signaling and preparation) between RAN nodes, which causes latency in the handover procedure and therefore increases the risk of handover failure. This procedure, which does not involve conditions that are checked at the UE, can be referred to as an "immediate" handover procedure.

More recently, for both SN (or PSCell) addition/change and handover, "conditional" procedures have been considered (i.e., conditional SN (or PSCell) addition/change and conditional handover). Unlike the "immediate" procedures discussed above that are performed unconditionally (i.e., without checking for condition(s)), these procedures do not add or change the SN (or PSCell), or perform the handover, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.).

To configure a conditional procedure, the RAN provides the condition to the UE, along with configurations (e.g., one or more random-access preambles, physical layer configurations, a medium access control configuration, radio link control configurations, etc.) that will enable the UE to communicate with the appropriate base station, or via the appropriate cell, when the condition is satisfied. For a conditional addition of a base station as an SN (or a candidate cell as a PSCell), for example, the RAN provides the UE with a condition to be satisfied before the UE can add that base station as the SN (or that candidate cell as the PSCell), and a configuration that enables the UE to communicate with that base station (or PSCell) after the condition has been satisfied.

In some cases, the RAN can provide a conditional configuration to the UE, and prior to the UE completing or initiating the corresponding conditional procedure, the RAN may configure the UE to perform an immediate procedure.

However, in some of these scenarios, the UE and/or RAN do not properly handle the conditional configuration.

SUMMARY

Generally speaking, a UE and one or more base stations operating in a RAN implement the techniques of this disclosure to efficiently manage conditional configuration related to a conditional procedure, particularly to release conditional configuration when RAN determines that the UE should perform an immediate procedure that supersedes the conditional procedure or otherwise renders the conditional procedure unnecessary. As used herein, the term "conditional configuration" refers to a configuration associated with a condition that is to be satisfied before the UE can communicate with a candidate base station, or via a candidate cell, using that configuration when performing a conditional procedure. In contrast, an "immediate configuration" does not require the UE to check for a condition such a condition when performing an immediate procedure. Using these techniques, for example, the UE can determine whether the UE should release a received conditional configuration associated with a candidate SN (C-SN) or a candidate handover/target cell.

In some implementations, the RAN informs the UE whether to release a conditional configuration, by providing an indication that the UE is to release the conditional configuration. In some implementations, the indication may include a message that includes a release indicator instructing the UE to release the conditional configuration. In other implementations, the indication may include an instruction to initiate an immediate procedure, which serves as an implicit instruction to release the conditional configuration.

One example implementation of these techniques is a method, in a RAN, that includes transmitting, by the processing hardware and to the UE, (i) a conditional configuration related to a base station operating in the RAN, and (ii) a condition to be satisfied before the UE applies the conditional configuration during a conditional procedure. The method also includes determining, by the processing hardware and subsequently to the transmitting, that the UE is to perform an immediate procedure related to the RAN. The method also includes providing, by the processing hardware and to the UE, an indication that the UE is to release the conditional configuration.

Another example implementation of these techniques is a method in a user device communicating with a base station. The method includes receiving, by the processing hardware and from a radio access network (RAN), (i) a conditional configuration related to a base station operating in the RAN, and (ii) a condition to be satisfied before the UE applies the conditional configuration during a conditional procedure. The method also includes subsequently to receiving the conditional configuration, receiving, by the processing hardware and from the RAN, an indication that the UE is to release the conditional configuration. The method also includes releasing, by the processing hardware, the conditional configuration in response to the indication.

DETAILED DESCRIPTION OF THE DRAWINGS

Figure 1A:
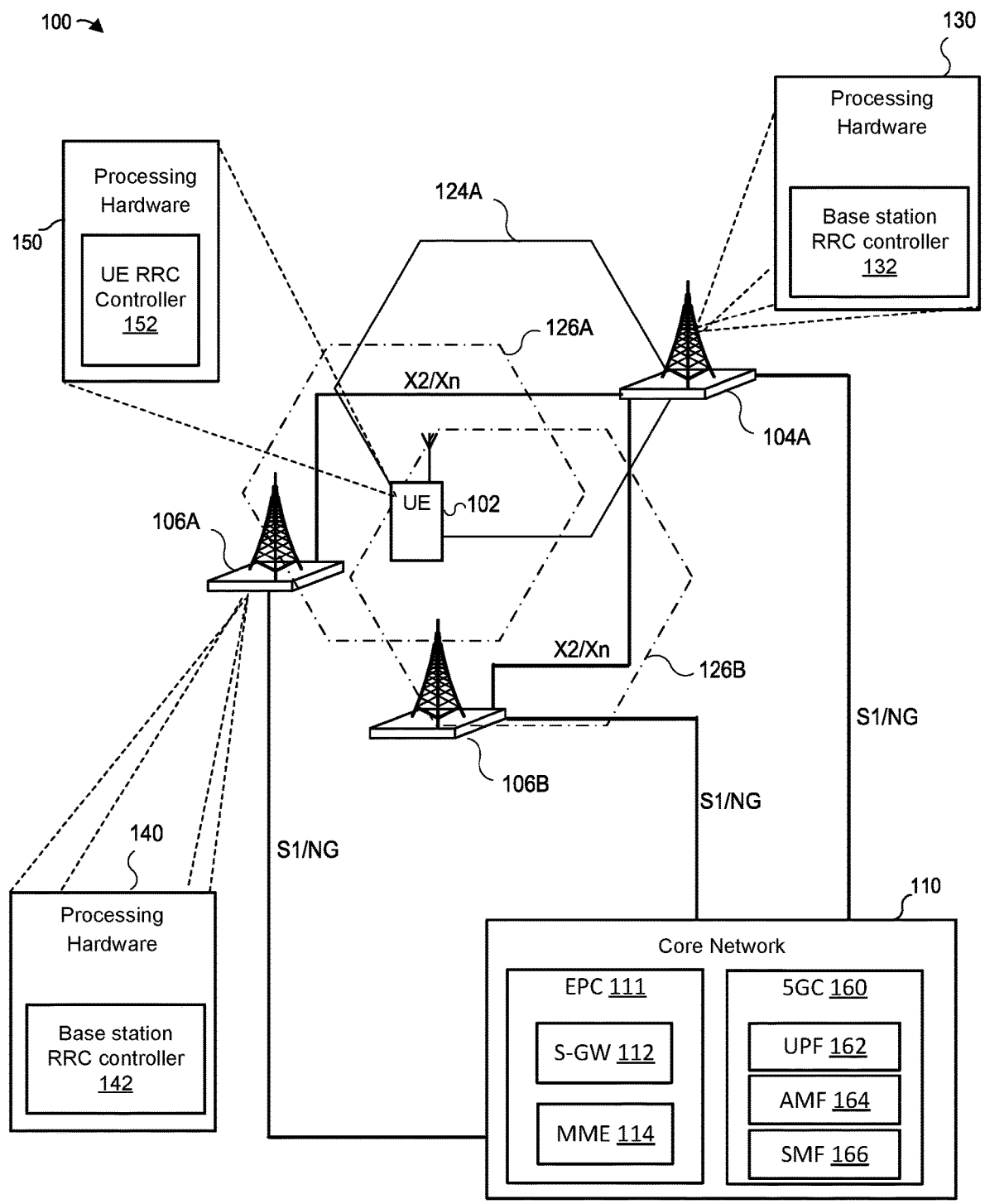
FIGS. 1A and 1B are block diagrams of example systems in which a radio access network (RAN) and a user device (UE) can implement techniques of this disclosure for handling configurations associated with conditional handover (CHO), conditional secondary node addition/change (CSAC), and/or conditional primary secondary cell (CPAC) procedures.

FIG. 1A depicts an example wireless communication system 100 that can implement conditional configuration managing techniques of this disclosure. The wireless communication system 100 includes a UE 102, as well as base stations 104A, 106A, 106B that are connected to a core network (CN) 110. The base stations 104A, 106A, 106B can be any suitable type, or types, of base stations, such as an evolved node B (eNB), a next-generation eNB (ng-eNB), or a 5G Node B (gNB), for example. As just one more specific example, the base station 104A may be an eNB or a gNB, and the base station 106A and 106B may be gNBs.

The base station 104A supports a cell 124A, the base station 106A supports a cell 126A, and the base station 106B supports a cell 126B. The cell 124A partially overlaps with both of cells 126A, 126B, such that the UE 102 can be in range to communicate with base station 106A while simultaneously being in range to communicate with base station 106A or 106B (or in range to detect or measure the signal from both base stations 104A, 106A, etc.). The overlap makes it possible for the UE 102 to hand over between cells (e.g., from cell 124A to cell 126A or 126B) before the UE 102 experiences radio link failure. Moreover, the overlap allows the various dual connectivity (DC) scenarios discussed below. For example, the UE 102 can communicate in DC with the base station 104A (operating as an MN) and the base station 106A (operating as an SN) and, upon completing an SN change, can communicate with the base station 104A (operating as an MN) and the base station 106B (operating as an SN). More particularly, when the UE 102 is in DC with the base station 104A and the base station 106A, the base station 104A operates as an MeNB, an Mng-eNB or an MgNB, and the base station 106A operates as an SgNB or an Sng-eNB. In implementations and scenarios where the UE 102 is in SC with the base station 104A but is capable of operating in DC, the base station 104A operates as an MeNB, an Mng-eNB or an MgNB, and the base station 106A operates as a candidate SgNB (C-SgNB) or a candidate Sng-eNB (C-Sng-eNB). Although various scenarios are described below in which the base station 104A operates as an MN and the base station 106A (or 106B) operates as an SN or C-SN, any of the base stations 104A, 106A, 106B generally can operate as an MN, an SN or a C-SN in different scenarios. Thus, in some implementations, the base station 104A, the base station 106A, and the base station 106B can implement similar sets of functions and each support MN, SN and C-SN operations.

In operation, the UE 102 can use a radio bearer (e.g., a DRB or an SRB) that at different times terminates at an MN (e.g., the base station 104A) or an SN (e.g., the base station 106A). The UE 102 can apply one or more security keys when communicating on the radio bearer, in the uplink (from the UE 102 to a base station) and/or downlink (from a base station to the UE 102) direction.

The base station 104A includes processing hardware 130, which may include one or more general-purpose processors (e.g., central processing units (CPUs)) and a computer-readable memory storing machine-readable instructions executable on the general-purpose processor(s), and/or special-purpose processing units. The processing hardware 130 in the example implementation of FIG. 1A includes a base station RRC controller 132 that is configured to manage or control RRC procedures and RRC configurations. For example, the base station RRC controller 132 may be configured to support RRC messaging associated with immediate and CHO procedures, immediate and CSAC procedures, and/or to support the necessary operations when the base station 104A operates as an MN, as discussed below. Moreover, in some implementations and/or scenarios, the base station RRC controller 132 may be responsible for handling (for the UE 102 and a number of other UEs not shown in FIG. 1A) the release of conditional configurations in accordance with various implementations discussed below.

The base station 106A includes processing hardware 140, which may include one or more general-purpose processors (e.g., CPUs) and a computer-readable memory storing machine-readable instructions executable on the general-purpose processor(s), and/or special-purpose processing units. The processing hardware 140 in the example implementation of FIG. 1A includes a base station RRC controller 142 that is configured to manage or control RRC procedures and RRC configurations. For example, the base station RRC controller 142 may be configured to support RRC messaging associated with immediate and CHO procedures, CPAC procedures, and/or to support the necessary operations when the base station 106A operates as an SN or candidate SN (C-SN), as discussed below. Moreover, in some implementations and/or scenarios, the base station RRC controller 142 may be responsible for handling (for the UE 102 and a number of other UEs not shown in FIG. 1A) the release of conditional configurations in accordance with various implementations discussed below. While not shown in FIG. 1A, the base station 106B may include processing hardware similar to the processing hardware 140 of the base station 106A.

The UE 102 includes processing hardware 150, which may include one or more general-purpose processors (e.g., CPUs) and a computer-readable memory storing machine-readable instructions executable on the general-purpose processor(s), and/or special-purpose processing units. The processing hardware 150 in the example implementation of FIG. 1A includes a UE RRC controller 152 that is configured to manage or control RRC procedures and RRC configurations. For example, the UE RRC controller 152 may be configured to support RRC messaging associated with immediate and CHO and/or SN addition/modification procedures, and may also be responsible for releasing conditional configurations for the UE 102 as needed in accordance with any of the implementations discussed below.

The CN 110 may be an evolved packet core (EPC) 111 or a fifth-generation core (5GC) 160, both of which are depicted in FIG. 1A. The base station 104A may be an eNB supporting an S1 interface for communicating with the EPC 111, an ng-eNB supporting an NG interface for communicating with the 5GC 160, or as a gNB that supports the NR radio interface as well as an NG interface for communicating with the 5GC 160. The base station 106A may be an EN-DC gNB (en-gNB) with an S1 interface to the EPC 111, an en-gNB that does not connect to the EPC 111, a gNB that supports the NR radio interface as well as an NG interface to the 5GC 160, or an ng-eNB that supports an EUTRA radio interface as well as an NG interface to the 5GC 160. To directly exchange messages with each other during the various scenarios discussed below, the base stations 104A, 106A, 106B may support an X2 or Xn interface.

Among other components, the EPC 111 can include a Serving Gateway (S-GW) 112 and a Mobility Management Entity (MME) 114. The S-GW 112 is generally configured to transfer user-plane packets related to audio calls, video calls, Internet traffic, etc., and the MME 114 is generally configured to manage authentication, registration, paging, and other related functions. The 5GC 160 includes a User Plane Function (UPF) 162 and an Access and Mobility Management Function (AMF) 164, and/or a Session Management Function (SMF) 166. The UPF 162 is generally configured to transfer user-plane packets related to audio calls, video calls, Internet traffic, etc., the AMF 164 is generally configured to manage authentication, registration, paging, and other related functions, and the SMF 166 is generally configured to manage PDU sessions.

Generally, the wireless communication system 100 may include any suitable number of base stations supporting NR cells and/or EUTRA cells. More particularly, the EPC 111 or the 5GC 160 can be connected to any suitable number of base stations supporting NR cells and/or EUTRA cells. For example, an additional base station is considered in immediate and CHO scenarios that are discussed below with reference to FIG. 1B. Although the examples below refer specifically to specific CN types (EPC, 5GC) and RAT types (5G NR and EUTRA), in general the techniques of this disclosure can also apply to other suitable radio access and/or core network technologies, such as sixth generation (6G) radio access and/or 6G core network or 5G NR-6G DC, for example.

As indicated above, the wireless communication system 100 may support various procedures (e.g., handover, SN addition, etc.) and modes of operation (e.g., SC or DC). Example operation of various procedures that may be implemented in the wireless communication system 100 will now be described.

In some implementations, the wireless communication system 100 supports immediate handovers between cells. In one scenario, for example, the UE 102 initially connects to the base station 104A, and the base station 104A later performs an immediate handover procedure with the base station 106A via an interface (e.g., X2 or Xn). In this scenario, the base stations 104A and 106A operate as a source base station and a target base station, respectively. In the handover procedure, the source base station 104A sends a Handover Request message to the target base station 106A. In response, the target base station 106A includes an immediate handover command message in a Handover Request Acknowledge message, and sends the Handover Request Acknowledge message to the source base station 104A. The source base station 104A then transmits the handover command message to the UE 102 in response to receiving the Handover Request Acknowledge message.

Upon receiving the immediate handover command message, the UE 102 immediately reacts to the immediate handover command, by attempting to connect to the target base station 106A. To connect to the target base station 106A, the UE 102 may perform a random access procedure with the target base station 106A, and then (after gaining access to a control channel) transmit a handover complete message to the target base station 106A via a cell of the base station 106A (i.e., in response to the immediate handover command).

In some implementations, the wireless communication system 100 also supports CHO. In one scenario, for example, the UE 102 initially connects to the base station 104A, and the base station 104A later performs a CHO procedure with the base station 106A via an interface (e.g., X2 or Xn) to prepare for a potential handover of the UE 102 to the base station 106A. In this scenario, the base stations 104A and 106A operate a source base station and a candidate base station, respectively. In the CHO procedure, the source base station 104A sends a Handover Request message to the candidate base station 106A. In response, the candidate base station 106A includes a CHO command message in a Handover Request Acknowledge message, and sends the Handover Request Acknowledge message to the source base station 104A. The source base station 104A then transmits the CHO command message to the UE 102, in response to receiving the Handover Request Acknowledge message.

Upon receiving the CHO command message, the UE 102 does not immediately react to the CHO command message by attempting to connect to the candidate base station 106A. Instead, the UE 102 connects to the candidate base station 106A according to the CHO command message only if the UE 102 determines that a condition is satisfied for handing over to a candidate cell 126A of the candidate base station 106A. The base station 106A provides a configuration for the candidate cell 126A (i.e., a configuration that the UE 102 can use to connect with the base station 106A via the candidate cell 126A) in the CHO command message.

Before the condition is met, the UE 102 has not yet connected to the candidate base station 106A. In other words, the candidate base station 106A has not yet connected and served the UE 102. In some implementations, the condition can be that a signal strength/quality, as measured by the UE 102 on the candidate cell 126A of the candidate base station 106A, is "good" enough. For example, the condition may be satisfied if one or more measurement results obtained by the UE 102 (when performing measurements on the candidate cell 126A) are above a threshold that is configured by the source base station 104A, or above a pre-determined or pre-configured threshold. If the UE 102 determines that the condition is satisfied, the candidate base station 106A becomes the target base station 106A for the UE 102, and the UE 102 attempts to connect to the target base station 106A. To connect to the target base station 106A, the UE 102 may perform a random access procedure with the target base station 106A, and then (after gaining access to a control channel) transmit a handover complete message via the candidate cell 126A to the target base station 106A. After the UE 102 successfully completes the random access procedure and/or transmits the handover complete message, the target base station 106A becomes the source base station 106A for the UE 102, and the UE 102 starts communicating data with the source base station 106A.

In some implementations, the wireless communication system 100 supports DC operation, including SN addition and SN change procedures. In one scenario, for example, after the UE 102 connects to the base station 104A, the base station 104A can perform an immediate SN addition procedure to add the base station 106A as a secondary node, thereby configuring the UE 102 to operate in DC with the base stations 104A and 106A. At this point, the base stations 104A and 106A operate as an MN and an SN, respectively. Later, while the UE 102 is still in DC with the MN 104A and the SN 106A, the MN 104A may perform an immediate SN change procedure to change the SN of the UE 102 from the base station 106A (which may be referred to as the source SN or S-SN) to the base station 106B (which may be referred to as the target SN or T-SN).

In other scenarios, the base station 104A may perform a CSAC procedure to configure the base station 106A as a candidate SN (C-SN) for the UE 102, while the UE 102 is in single connectivity (SC) with the base station 104A, or while the UE 102 is in DC with the base stations 104A and 106B, and before the UE 102 has connected to the C-SN 106A. In this case, the base stations 104A and 106A operate as an MN and a C-SN, respectively, for the UE 102. When the UE 102 receives the configuration for the C-SN 106A, the UE 102 does not connect to the C-SN 106A unless and until the UE 102 detects that the corresponding condition is satisfied. If the UE 102 determines that the condition is satisfied, the UE 102 connects to the C-SN 106A, such that the C-SN 106A becomes the SN 106A for the UE 102.

In some implementations, the condition can be that a signal strength/quality, as measured by the UE 102 on a candidate primary secondary cell (C-PSCell) of the C-SN 106A, is "good" enough. For example, the condition may be satisfied if one or more measurement results obtained by the UE 102 (when performing measurements on the C-PSCell) are above a threshold that is configured by the MN 104A, or above a pre-determined or pre-configured threshold. If the UE 102 determines that the condition is satisfied, the UE 102 may perform a random access procedure with the C-SN 106A to connect to the C-SN 106A. Once the UE 102 successfully completes the random access procedure, the base station 106A becomes an SN for the UE 102, and the C-PSCell (e.g., cell 126A) becomes a PSCell for the UE 102. The SN 106A may then start communicating data with the UE 102.

Yet another scenario relates to an immediate PSCell change. In this scenario, the UE 102 is initially in DC with the MN 104 (via a primary cell (PCell)) and the SN 106A (via a PSCell, not shown in FIG. 1A, that is different than cell 126A). The SN 106A can provide a configuration for the C-PSCell 126A, for the UE 102. If the UE 102 is configured to a signaling radio bearer (SRB) that permits the exchange of RRC messages with the SN 106A (e.g., SRB3), the SN 106A may transmit the configuration for the C-PSCell 126A to the UE 102 directly via the SRB. Otherwise, the SN 106A may transmit the configuration for the C-PSCell 126A to the UE 102 via the MN 104A. In some scenarios, the SN 106A may exchange RRC messages with the UE 102 via the MN 104A even though the UE is configured to the SRB. The SN 106A may transmit the configuration in response to one or more measurement results received from the UE 102 via the SRB or via the MN 104, or in response to one or more measurement results obtained by the SN 106A from measurements on signals received from the UE 102, for example. The UE 102 immediately connects to the C-PSCell 126A after receiving the configuration for the C-PSCell 126A, such that the C-PSCell 126A begins to operate as the PSCell 126A for the UE 102. In some implementations, the UE 102 disconnects from the PSCell in order to connect to the C-PSCell 126A.

Yet another scenario relates to a CPAC. In contrast to the immediate PSCell change case discussed above, the UE 102 does not immediately disconnect from the PSCell and attempt to connect to the C-PSCell 126A after receiving the configuration for the C-PSCell 126A. Instead, the UE 102 does not connect to the C-PSCell 126A until the UE 102 determines that a certain condition is satisfied. When the UE 102 determines that the condition has been satisfied, the UE 102 connects to the C-PSCell 126A, such that the C-PSCell 126A begins to operate as the PSCell 126A for the UE 102. In some implementations, the UE 102 disconnects from the PSCell in order to connect to the C-PSCell 126A.

In some scenarios, the condition associated with CSAC or conditional PSCell change can be that signal strength/quality, as measured by the UE 102 on a C-PSCell of the C-SN 106A, exceeds a certain threshold or otherwise corresponds to an acceptable measurement. For example, when the one or more measurement results that the UE 102 obtains on the C-PSCell 126A are above a threshold configured by the MN 104 or the C-SN 106A, or above a pre-determined or pre-configured threshold, the UE 102 may determine that the condition is satisfied. When the UE 102 determines that such a condition is satisfied, the UE 102 can perform a random access procedure on the C-PSCell 126A and with the C-SN 106A to connect to the C-SN 106A. Once the UE 102 successfully completes the random access procedure on the C-PSCell 126A, the C-PSCell 126A becomes a PSCell 126A for the UE 102. The C-SN 106A can then start communicating data (user-plane data and/or control-plane data) with the UE 102 through the PSCell 126A.

In different configurations or scenarios of the wireless communication system 100, the base station 104A may operate as a master eNB (MeNB) or a master gNB (MgNB), and the base station 106A or 106B can be implemented as a secondary gNB (SgNB) or a candidate SgNB (C-SgNB). The UE 102 may communicate with the base station 104A and the base station 106A or 106B via the same radio access technology (RAT), such as EUTRA or NR, or via different RATs. If the base station 104A is an MeNB and the base station 106A is an SgNB, the UE 102 may be in EUTRA-NR DC (EN-DC) with the MeNB and the SgNB. In this scenario, the MeNB 104A may or may not configure the base station 106B as a C-SgNB to the UE 102. When the base station 104A is an MeNB and the base station 106A is a C-SgNB for the UE 102, the UE 102 may be in SC with the MeNB. In this scenario, the MeNB 104 may or may not configure the base station 106B as another C-SgNB to the UE 102.

In some cases, an MeNB, an SeNB or a C-SgNB may be implemented as an ng-eNB rather than an eNB. When the base station 104A is a master ng-eNB (Mng-eNB) and the base station 106A is an SgNB, the UE 102 may be in next generation (NG) EUTRA-NR DC (NGEN-DC) with the Mng-eNB and the SgNB. In this scenario, the MeNB 104A may or may not configure the base station 106B as a C-SgNB to the UE 102. When the base station 104A is an Mng-NB and the base station 106A is a C-SgNB for the UE 102, the UE 102 may be in SC with the Mng-NB. In this scenario, the Mng-eNB 104A may or may not configure the base station 106B as another C-SgNB to the UE 102.

When the base station 104A is an MgNB and the base station 106A is an SgNB, the UE 102 may be in NR-NR DC (NR-DC) with the MgNB and the SgNB. In this scenario, the MeNB 104A may or may not configure the base station 106B as a C-SgNB to the UE 102. When the base station 104A is an MgNB and the base station 106A is a C-SgNB for the UE 102, the UE 102 may be in SC with the MgNB. In this scenario, the MgNB 104A may or may not configure the base station 106B as another C-SgNB to the UE 102.

When the base station 104A is an MgNB and the base station 106A is a secondary ng-eNB (Sng-eNB), the UE 102 may be in NR-EUTRA DC (NE-DC) with the MgNB and the Sng-eNB. In this scenario, the MgNB 104A may or may not configure the base station 106B as a C-Sng-eNB to the UE 102. When the base station 104A is an MgNB and the base station 106A is a candidate Sng-eNB (C-Sng-eNB) for the UE 102, the UE 102 may be in SC with the MgNB. In this scenario, the MgNB 104A may or may not configure the base station 106B as another C-Sng-eNB to the UE 102.

Figure 1B:
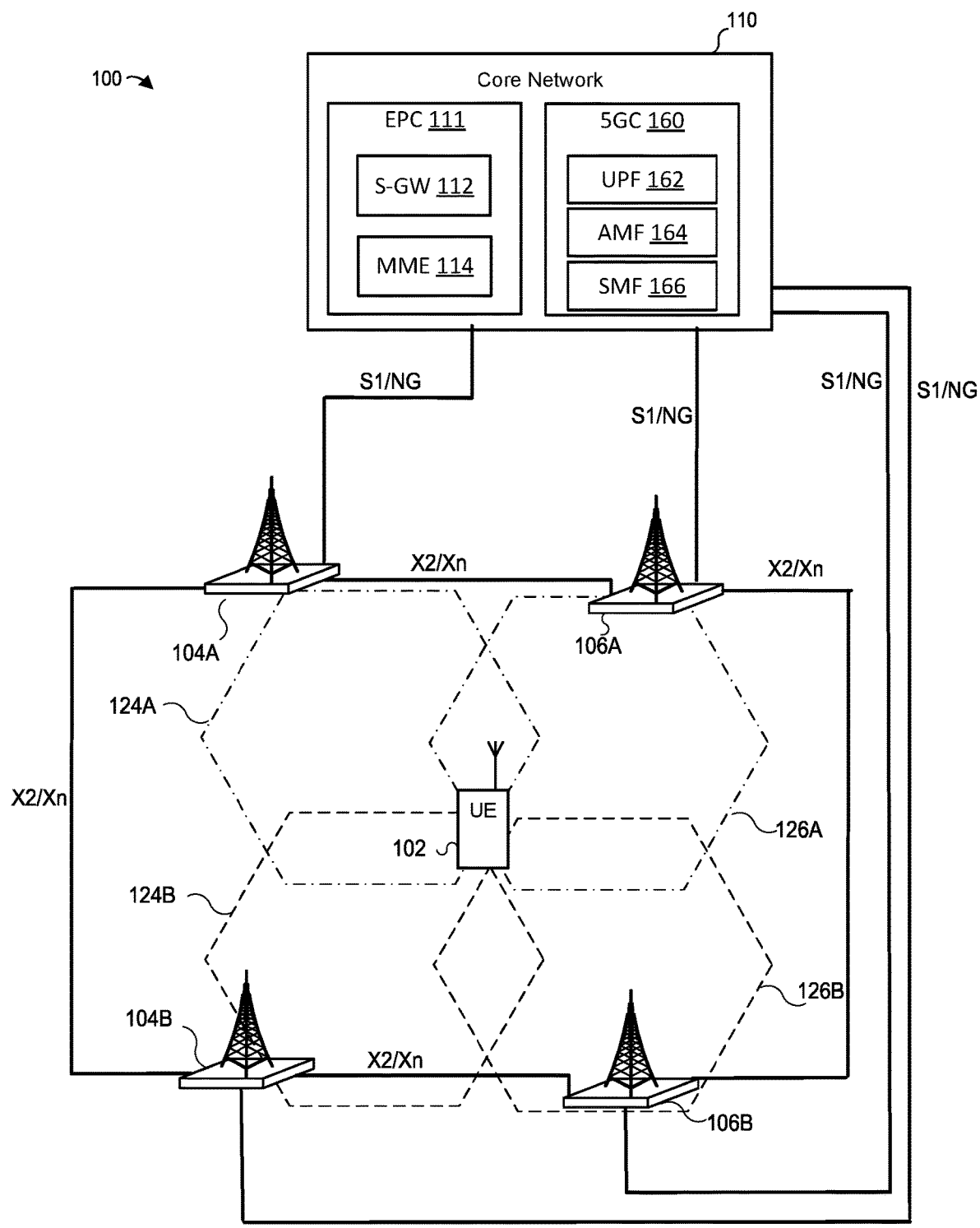

FIG. 1B illustrates another implementation of the wireless communication system 100, where the CN 110 is connected to the base station 104B in addition to the base stations 104A, 106A, 106B. The base station 104B may be similar to the base station 104A as discussed above with reference to FIG. 1A, and possibly also similar to the base stations 106A and/or 106B. The base station 104B may support X2 or Xn interfaces to connect to base stations 104A, 106A, 106B. The base station 104B supports a cell 124B. The cells 124B and 124A may partially overlap, such that the UE 102 can detect or measure the signal from both the base station 104B and the base station 104A while in a fixed location. In some implementations, the base stations 104A, 104B, 106A and/or 106B support one or more additional cells not shown in FIG. 1B. The base stations 104A, 104B, 106A, 106B may support immediate handover, CHO, immediate SN addition/change procedures, CSAC procedures, immediate PSCell change procedures, and/or CPAC procedures, such as those discussed above and as discussed in further detail below.

Figure 1C:
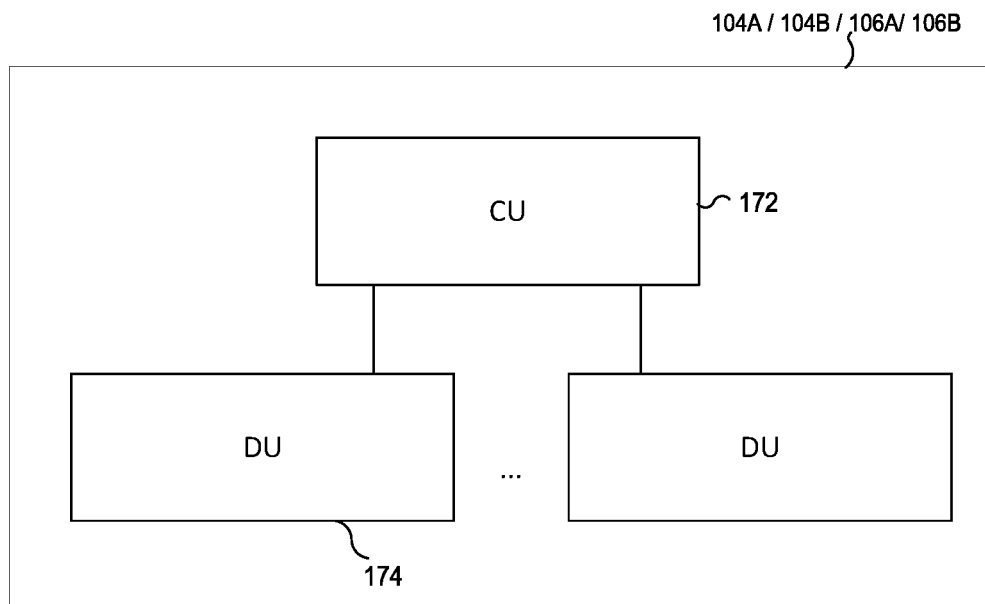
FIG. 1C is a block diagram of an example base station in which a centralized unit (CU) and distributed units (DUs) can operate in the system of FIG. 1A or FIG. 1B.

FIG. 1C depicts an example, distributed implementation of any one or more of the base stations 104A, 104B, 106A, 106B. In this implementation, the base station 104A, 104B, 106A or 106B includes a centralized unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 may include the processing hardware 130 or 140 of FIG. 1A. The processing hardware may include a base station RRC controller (e.g., controller 142) configured to manage or control one or more RRC configurations and/or RRC procedures when the base station (e.g., base station 106A) operates as an SN or a candidate SN (C-SN).

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware may include a medium access control (MAC) controller configured to manage or control one or more MAC operations or procedures (e.g., a random access procedure), and a radio link control (RLC) controller configured to manage or control one or more RLC operations or procedures when the base station (e.g., base station 106A) operates as an MN, an SN, or a C-SN. The processing hardware may also include a physical layer controller configured to manage or control one or more physical layer operations or procedures.

Figure 2:
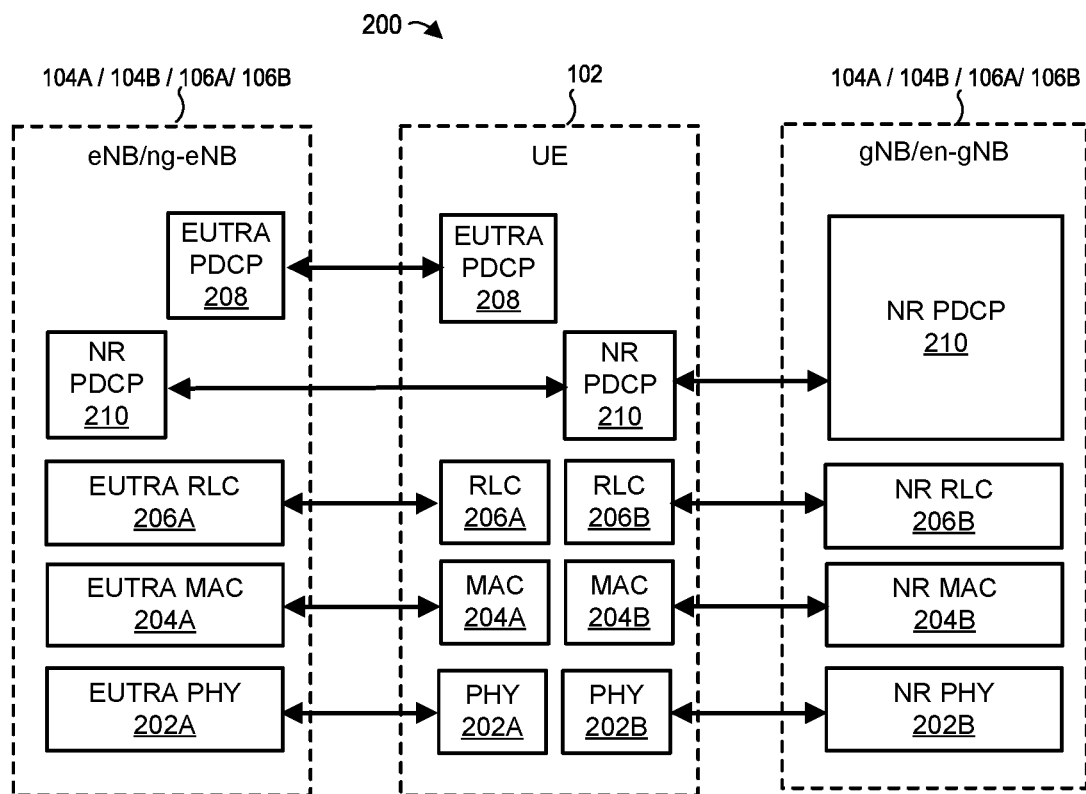
FIG. 2 is a block diagram of an example protocol stack, according to which the UE of FIG. 1A or FIG. 1B may communicate with the base stations of FIG. 1A or FIG. 1B.

FIG. 2 illustrates, in a simplified manner, an example radio protocol stack 200 according to which the UE 102 may communicate with an eNB/ng-eNB or a gNB (e.g., one or more of the base stations 104A, 104B, 106A, 106B). In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP sublayer 210 over the EUTRA RLC sublayer 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104A operating as an MeNB and the base station 106A operating as an SgNB, the wireless communication system 100 can provide the UE 102 with an MN-terminated bearer that uses the EUTRA PDCP sublayer 208, or an MN-terminated bearer that uses the NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can an SRB or a DRB.

FIGS. 3 through 11 are illustrate message sequences between the UE 102 and various base stations of the RAN (including base stations 104A, 106A and/or 106B), for a number of scenarios and implementations relating to conditional configuration handling.

Figure 10:
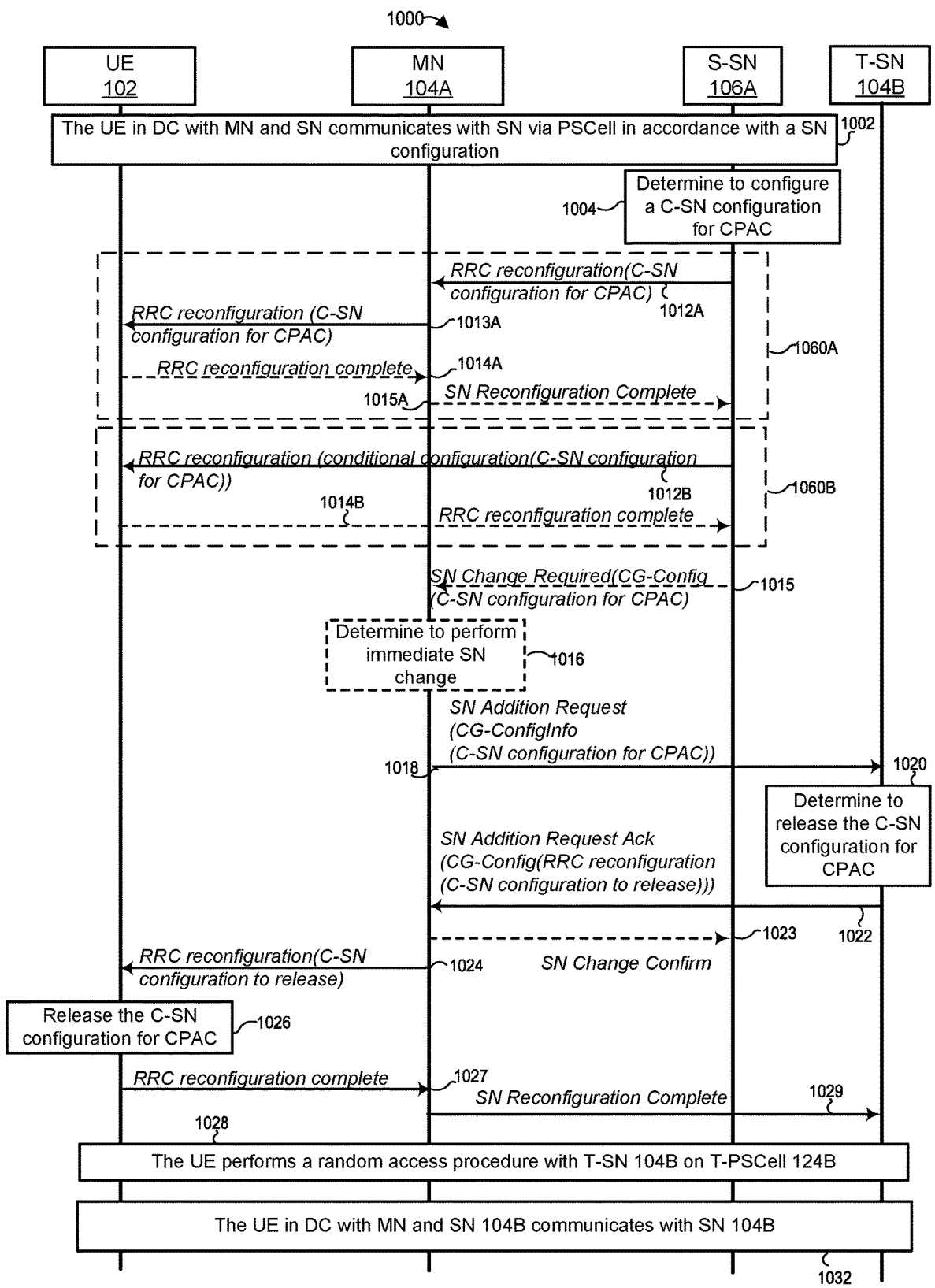
FIG. 10 is a messaging diagram of an example scenario in which the RAN includes a conditional configuration for CPAC in an SN Change Required message to handle release of the conditional configuration at the UE.
Figure 11:
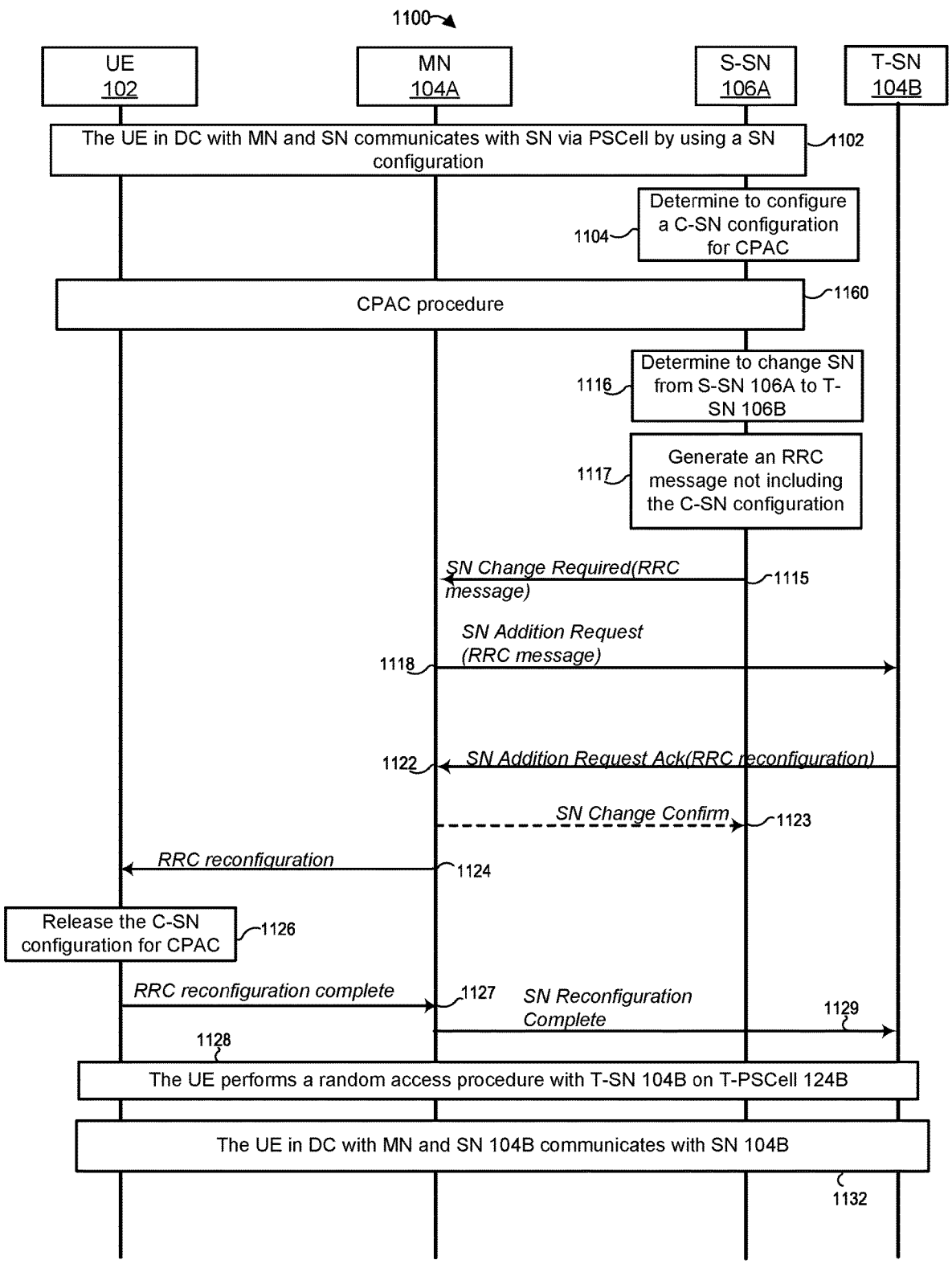
FIG. 11 is a messaging diagram of an example scenario in which the RAN excludes a conditional configuration for CPAC in an SN Change Required message to handle release of the conditional configuration at the UE.

In particular, FIGS. 3 (i.e., 3A and 3B) through 5 correspond to conditional scenarios in which the RAN of the wireless communication system 100 initially provides a conditional configuration for CHO to the UE 102, and later determines to release the conditional configuration stored at the UE 102 during an immediate handover procedure. FIGS. 6 (i.e., 6A and 6B) through 8 correspond to scenarios in which the RAN of the wireless communication system 100 initially provides a conditional configuration for CSAC to the UE 102, and later determines to release the conditional configuration stored at the UE 102 during an immediate handover procedure. FIGS. 9 (i.e., 9A and 9B) corresponds to scenarios in which the RAN of the wireless communication system 100 initially provides a first conditional configuration for CHO and a second conditional configuration for CSAC to the UE 102, and later determines to release the first and second conditional configurations stored at the UE 102 during an immediate handover procedure. FIGS. 10 and 11 correspond to scenarios in which the RAN of the wireless communication system 100 initially provides a conditional configuration for CPAC to the UE 102, and later determines to release the conditional configuration stored at the UE 102 during an immediate SN addition/change procedure.

Referring first to FIGS. 3A through 5, the RAN in the illustrates scenarios initially provides a conditional configuration for CHO to the UE 102, and later determines to release the conditional configuration stored at the UE 102 during an immediate handover procedure.

Figure 3A:
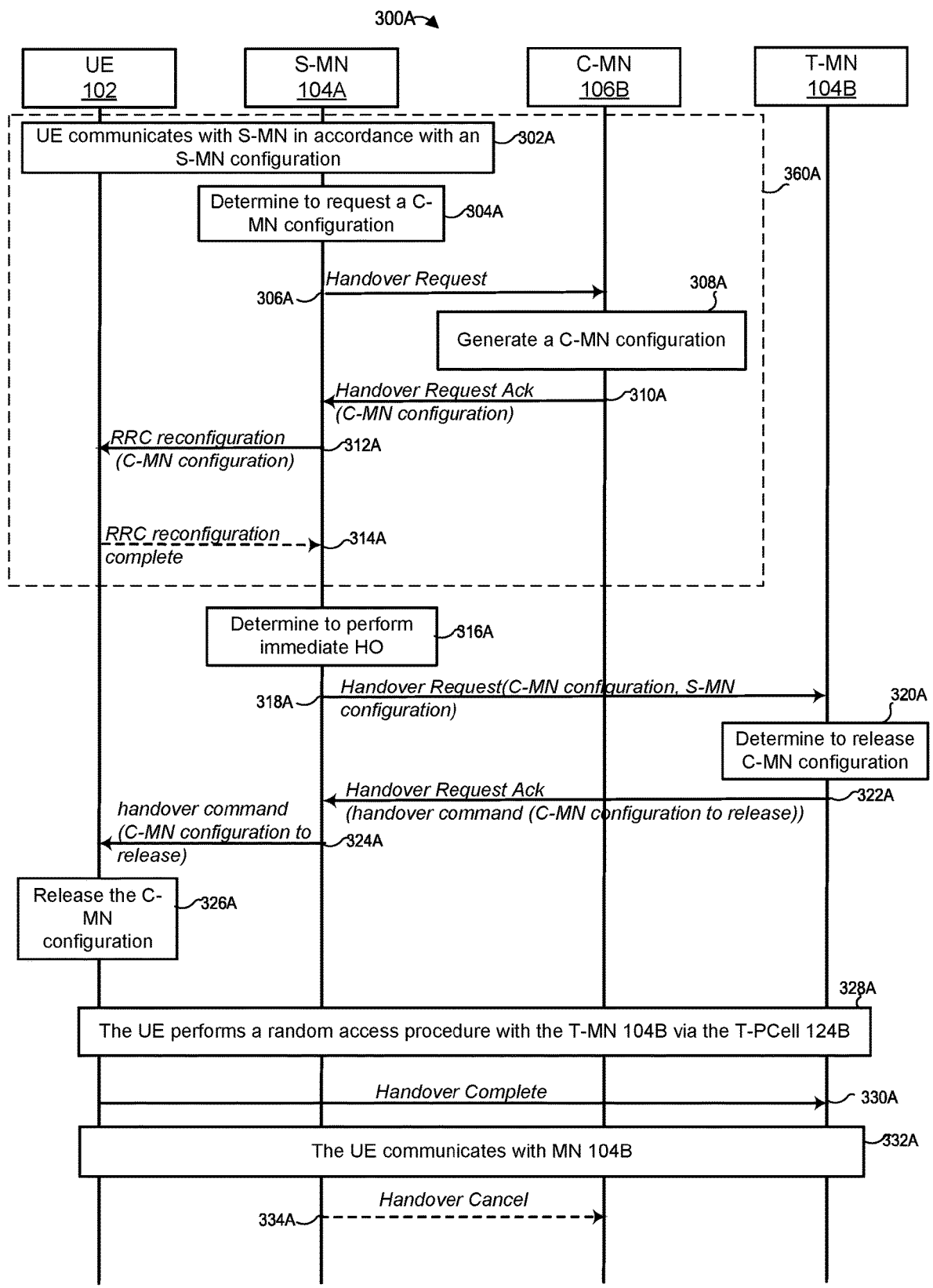
FIGS. 3A and 3B are messaging diagrams of example scenarios in which the RAN includes a conditional configuration for CHO in a Handover Request message to handle release of the conditional configuration at the UE.

According to a scenario 300A of FIG. 3A, the base station 104A operates as source MN (S-MN) for the UE 102, the base station 106B operates as a candidate MN (C-MN) for the UE 102, and the base station 104B operates as a target MN (T-MN) for the UE 102.

Initially, the UE 102 communicates 302A data (e.g., uplink (UL) data PDUs and/or downlink (DL) data PDUs) with the S-MN 104A via a primary cell (e.g., PCell 124A) by using an S-MN configuration.

At some point, upon determining to perform a CHO procedure for the C-MN 106B and the UE 102 to communicate, the S-MN 104A determines 304A to request, from the C-MN 106B, a conditional configuration (e.g., C-MN configuration) to provide to the UE 102, e.g., in response to detecting a suitable event. For example, the determination 304A may occur in response to the S-MN 104A receiving one or more measurement results from the UE 102 directly (e.g., via an SRB established between the UE 102 and the S-MN 104A or via a physical control channel) that are above (or below) one or more predetermined thresholds, or from the S-MN 104A having analyzed measurements on signals, control channels or data channels received from the UE 102. In another example, the suitable event can be that the UE 102 is moving toward the C-MN 106B.

After determining 304A to request the C-MN configuration, the S-MN 104A transmits 306A a Handover Request message to the C-MN 106B. In response to the Handover Request message, the C-MN 106B generates 308A a C-MN configuration, which includes information that would enable the UE 102 to communicate with the C-MN 106B via a candidate cell (which may be called a candidate PCell (C-PCell)). The C-MN 106B includes the C-MN configuration in a Handover Request Acknowledge message for the UE 102, and subsequently transmits 310A the Handover Request Acknowledge message to the S-MN 104A in response to the Handover Request message. In some implementations, instead of including the C-MN configuration in the Handover Request Acknowledge message, the C-MN 106B may include a CHO command in the Handover Request Acknowledge. In other cases, the C-MN 106B can include the C-MN configuration in the CHO command, and include the CHO command in a Handover Request Acknowledge message.

The S-MN 104A transmits 312A an RRC reconfiguration message including the C-MN configuration to the UE 102, which in turn optionally transmits 314A an RRC reconfiguration complete message to the S-MN 104A in response to receiving the RRC reconfiguration message. In some implementations, the S-MN 104A includes, in the C-MN configuration or in the RRC reconfiguration message, a condition (or conditions) for the UE 102 to detect, so that the UE 102 can communicate with the C-MN 106B if the condition is satisfied. The S-MN 104A can include the C-MN configuration in a conditional configuration field or information element (IE) of the RRC reconfiguration message. The S-MN 104A can further include a configuration identity/identifier (ID) associated to the C-MN configuration in the conditional configuration field/IE, so that the UE 102 can identify and store the C-MN configuration. The S-MN 104A may allocate the configuration ID, or receive the configuration ID from the C-MN 106B. The events 302A, 304A, 306A, 308A, 310A, 312A, 314A are collectively referred to in FIG. 3A as the CHO configuration procedure 360A.

Later on, and before the UE 102 determines that the condition for handing over to C-MN 106B is satisfied, the S-MN 104A determines 316A to perform an immediate handover procedure with the T-MN 104B, e.g., in response to detecting a suitable event, for the T-MN 104B and the UE 102 to communicate. For example, the determination 316A may occur in response to the S-MN 104A receiving one or more measurement results from the UE 102 that are above (or below) one or more predetermined thresholds, or from the S-MN 104A having analyzed measurements on signals, control channels or data channels received from the UE 102. In another example, the suitable event can be that the UE 102 is moving toward the T-MN 104B.

In response to the determination, the S-MN 104A sends 318A a Handover Request message to the T-MN 104B via an interface (e.g., X2/Xn interface) to request an immediate handover for the UE 102. The Handover Request message includes the S-MN configuration, so that the T-MN 104B is aware of any pre-existing configurations (e.g., S-MN configuration) known by the UE 102 to determine additional configuration(s) the UE 102 may still need when performing an immediate handover procedure to switch from the S-MN 104A to the T-MN 104B. In addition, because T-MN 104B is unaware of the C-MN configuration stored at the UE 102, the S-MN 104A also includes the C-MN configuration in the Handover Request message, so that upon receiving the Handover Request message, the T-MN 104B is aware of the C-MN configuration stored at the UE 102. In some implementations, the S-MN 104A can include the configuration ID associated to the C-MN configuration in the Handover Request message. In some implementations, the S-MN 104A can include the C-MN configuration and the S-MN configuration in a HandoverPreparationInfo IE (or RRC inter-node message) and include the HandoverPreparationInfo IE in the Handover Request message. In other implementations, the S-MN 104A may include the C-MN configuration and the S-MN configuration in an RRC message (e.g., RRC reconfiguration message), include the RRC message in a HandoverPreparationInfo IE, and then include the HandoverPreparationInfo IE in the Handover Request message. In some implementations, the S-MN 104A may include the configuration ID associated to the C-MN configuration in the RRC message or in the HandoverPreparationInfo IE.

Upon identifying the C-MN configuration indicated in the Handover Request message, the T-MN 104B determines 320A to release the C-MN configuration stored at the UE 102. In response to the determination, the T-MN 104B generates a handover command message including a C-MN configuration to release field/IE. The handover command message also includes one or more random access configurations needed by the UE 102 to handover to the T-MN 104B. In some implementations, the handover command message may have additional fields, such as a mobility field (e.g., mobilityControlInfo field or a reconfigurationWithSync field). The mobility field may include some or all of the random access configurations. The T-MN 104B then sends 322A a Handover Request Acknowledge message including the handover command message to the S-MN 104A in response to receiving 318A the Handover Request message. In some implementations, the T-MN 104B can include the configuration ID associated to the C-MN configuration in the C-MN configuration to release field/IE.

In implementations in which the S-MN 104A does not have a direct interface with the T-MN 104B, the S-MN 104A, the CN 110, and the T-MN 104B may collectively perform a CN procedure. To begin the CN procedure, the S-MN 104A may send a Handover Required message including the contents of the Handover Request message to a CN 110 (e.g., MME 114 or AMF 164) instead of sending 318A the Handover Request message. Then the CN 110 includes the contents of the Handover Required message in a Handover Request message generated by the CN 110. The CN 110 sends the generated Handover Request message to the T-MN 104B. The T-MN 104B performs the action 320A upon receiving the Handover Request message from the CN 110. Then the T-MN 104B generates a Handover Request Acknowledge message which includes the handover command message described above, and sends the Handover Request Acknowledge message to the CN 110 in response to the Handover Request message received from the CN 110. The CN 110 sends a Handover Confirm message including the handover command message to the S-MN 104A in response to the Handover Required message, concluding the CN procedure.

Upon receiving the handover command message (i.e., either from the CN 110 or T-MN 104B), the S-MN 104A transmits 324A the handover command message to the UE 102, causing the UE 102 to release 326A the stored C-MN configuration. In one implementation, the UE 102 can identify the configuration ID included in the C-MN configuration to release field/IE to release the C-MN configuration associated with the configuration ID. In some implementations, the UE 102 may also release the condition associated to the C-MN configuration if the UE 102 can identify the configuration ID included in the C-MN configuration to release field/IE. In other implementations, the UE 102 releases the conditional configuration field/IE including the C-MN configuration and the condition if the UE 102 identifies the configuration ID included in the C-MN configuration to release field/IE. In some implementations, the condition may be associated to at least one measurement configuration (e.g., MeasConfig IE) which the S-MN 104A configured to the UE 102 before transmitting the handover command message to the UE 102. The at least one measurement configuration is associated to a measurement identity (e.g., MeasId IE). In some implementations, the UE 102 may release the at least one measurement configuration if the UE 102 identifies the configuration ID included in the C-MN configuration to release field/IE. In other implementations, the UE 102 does not release the at least one measurement configuration if the UE 102 identifies the configuration ID included in the C-MN configuration to release field/IE. Instead, the UE 102 releases a measurement configuration in the at least one measurement configuration if the UE 102 identifies a measurement identity (associated to the measurement configuration) in a measurement identity to remove list field/IE (e.g., measIdToRemoveList) in the handover command message. The T-MN 104B may determine to release the measurement configuration in response to determining 320A to release the C-MN configuration, and as a result, include the measurement identity to remove list field/IE in the handover command message.

The UE 102 also performs the immediate handover with the T-MN 104B in response to the handover command message. When performing the handover, the UE 102 conducts 328A a random access procedure with the T-MN 104B via a T-PCell 124B, e.g., by using one or more random access configurations in the handover command message. The UE 102 transmits 330A a handover complete message during or after the random access procedure. If the UE 102 successfully completes the random access procedure, the UE 102 communicates 332A control signals and data with the MN 104B via the PCell 124B.

In some scenarios, the S-MN 104A can send 334A a Handover Cancel message to the C-MN 106B, in response to the S-MN 104A determining 316A to perform immediate handover or receiving 322A the Handover Request Acknowledge message, causing the C-MN 106B to release the C-MN configuration. To this end, the C-MN 106B need not waste its resources to keep the C-MN configuration, as the UE 102 is no longer configured to use the C-MN configuration to communicate with the C-MN 106B.

In some implementations, if the S-MN 104A is an eNB or a next generation eNB (ng-eNB), the RRC reconfiguration message and the RRC reconfiguration complete message can be an RRCConnectionReconfiguration message and a RRCConnectionReconfigurationComplete message respectively. If the S-MN 104A is a gNB, the RRC reconfiguration message and the RRC reconfiguration complete message can be an RRCReconfiguration message and an RRCReconfigurationComplete message respectively.

In some implementations, if the S-MN 104A is an eNB or ng-eNB, the handover command message and the handover complete message can be an RRCConnectionReconfiguration message and an RRCConnectionReconfigurationComplete message respectively. If the S-MN 104A is a gNB, the handover command message and the handover complete message can be an RRCReconfiguration message and an RRCReconfigurationComplete message respectively.

In some implementations, the C-MN configuration can be a complete and self-contained configuration (i.e. full configuration). The C-MN configuration may include a full configuration indication (an information element (IE) or a field) indicating that the C-MN configuration is a full configuration. The UE 102 can use the C-MN configuration (i.e. full configuration) to communicate with the C-MN 106B without referring to the S-MN configuration if the UE 102 connects to the C-MN 106B. In other implementations, the C-MN configuration is a delta configuration, in that the C-MN configuration can include one or more configurations "on top of" the S-MN configuration (i.e., one or more configurations not included in the S-MN configuration). The UE 102 can use the C-MN configuration (i.e. delta configuration) together with the S-MN configuration to communicate with the C-MN 106B if the UE 102 connects to the C-MN 106B.

In some implementations, the C-MN configuration can include multiple configuration parameters for the UE 102 to communicate with the C-MN 106B via a C-PCell 126B. The multiple configuration parameters may configure radio resources for the UE 102 to communicate with the C-MN 106B via the C-PCell 126B and zero, one, or more candidate secondary cells (C-SCells) of the C-MN 106B. The multiple configuration parameters may configure zero, one, or more radio bearers. The one or more radio bearers can include an SRB and/or DRB(s). Similarly, the S-MN configuration can include multiple configuration parameters for the UE 102 to communicate with the S-MN 104A via the PCell 124A and zero, one, or more secondary cells (SCells) of the S-MN 104A. The multiple configuration parameters may configure radio resources for the UE 102 to communicate with the S-MN 104A via the PCell 124A and zero, one, or more SCells of the S-MN 104A. The multiple configuration parameters may configure zero, one, or more radio bearers. The one or more radio bearers can include an SRB and/or DRB(s).

In some implementations, the C-MN configuration can include a cell group configuration (CellGroupConfig) IE that configures the C-PCell 126B and may configure zero, one, or more C-SCells of the C-MN 106B. In one implementation, the C-MN configuration can be an RRCReconfiguration message, RRCReconfiguration-IEs or the CellGroupConfig IE conforming to 3GPP TS 38.331. The full configuration indication may be a field or an IE conforming to 3GPP TS 38.331. In other implementations, the C-MN configuration can be an RRCConnectionReconfiguration message or an RRCConnectionReconfiguration-IEs conforming to 3GPP TS 36.331. The full configuration indication may be a field or an IE conforming to 3GPP TS 36.331. In another implementation, the C-MN configuration may be included in a conditional configuration field or information element (IE) and the conditional configuration field/IE can be further included in an RRCReconfiguration message, RRCReconfiguration-IEs or the CellGroupConfig IE conforming to 3GPP TS 38.331. In other implementations, the C-MN configuration can be an RRCConnectionReconfiguration message or an RRCConnectionReconfiguration-IEs conforming to 3GPP TS 36.331. The conditional configuration field/IE can be a CHO-Config (e.g. CHO-Config-r16) for an NR configuration or a ConditionalReconfiguration (e.g. ConditionalReconfiguration-r16) for an EUTRA configuration. The conditional configuration field/IE may include at least a list of conditional configurations to be removed (e.g. cho-ConfigToRemoveList or condReconfigurationToRemoveList), a list of conditional configurations to be added or modified (e.g., cho-ConfigToAddModList or condReconfigurationToAddModList) and an attemptCHO field/IE. The list of conditional configuration to be added or modified is a list of conditional configurations which may contain a configuration ID (e.g. cho-ConfigId-r16, or condReconfigurationId-r16), an execution condition (e.g., cho-ExecutionCond-r16 or triggerCondition-r16), and the C-MN configuration, i.e., a configuration to apply when the execution condition is met or triggered (e.g., cho-RRCReconfig-r16, condReconfigurationToApply-r16). The C-MN configuration to release field/IE in one implementation can be the list of conditional to configurations be removed and it may consist of a list of configuration IDs.

In some implementations, the S-MN configuration can include a CellGroupConfig IE that configures the PCell 124A and may configure zero, one, or more SCells of the S-MN 104A. In one implementation, the S-MN configuration can be an RRCReconfiguration message, RRCReconfiguration-IEs or the CellGroupConfig IE conforming to 3GPP TS 38.331. In other implementations, the S-MN configuration can be an RRCConnectionReconfiguration message or RRCConnectionReconfiguration-IEs conforming to 3GPP TS 36.331.

In some implementations, the C-MN 106B may consist of CU 172 and one or more DU 174 as shown in FIG. 1C. The DU 174 may generate the C-MN configuration or at least a portion of the C-MN configuration, and send the C-MN configuration (or portion) to the CU 172. The CU 172 may generate the remainder of the C-MN configuration if the DU 174 only generated a portion of the C-MN configuration. In some implementations, the T-MN 106B may consist of CU 172 and one or more DU 174 as shown in FIG. 1C. The DU 174 may generate some configurations in the handover command and send the configurations to the CU 172. For example, the configurations generated by the DU 174 may include the one or more random access configurations, a physical downlink control channel (PDCCH) configuration, physical uplink control channel (PUCCH) configuration, etc. The CU 172 may generate other configurations (e.g., an SRB configuration, an DRB configuration, a security configuration and/or a measurement configuration) in the handover command. In other implementations, the DU 174 may generate a cell group configuration (CellGroupConfig) IE in the handover command and the CU 172 may generate a radio bearer configuration (RadioBearerConfig) IE.

Figure 3B:
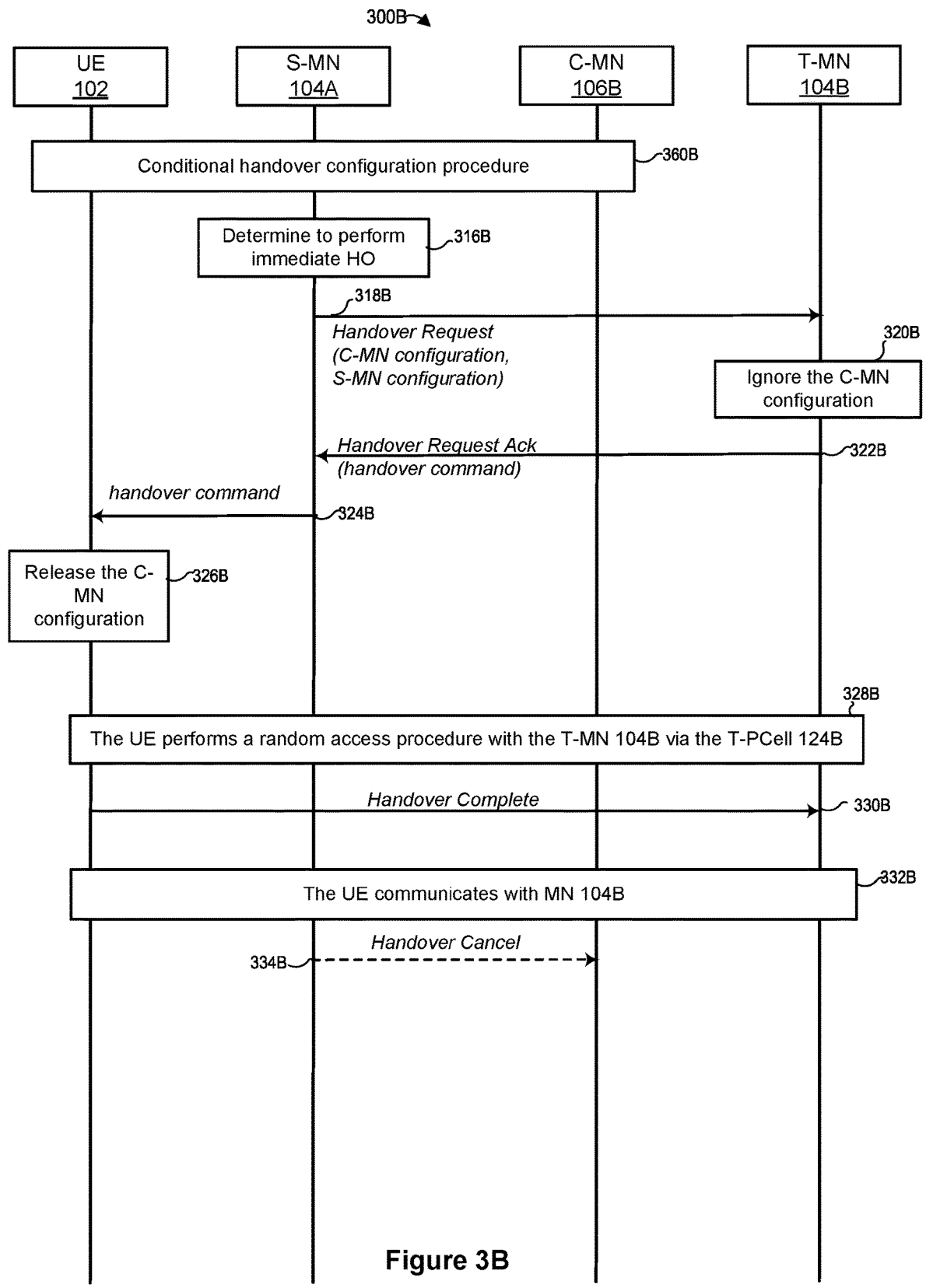

In a scenario 300B of FIG. 3B, the UE 102, S-MN 104A, and C-MN 106B collectively perform 360B the conditional handover configuration procedure, similar to event 360A.

Subsequently, and before the UE 102 determines that the condition for handing over to C-MN 106B is satisfied, the S-MN 104A determines 316B to perform an immediate handover procedure with the T-MN 104B, and subsequently sends 318B a Handover Request message to the T-MN 104B via an interface (e.g., X2/Xn interface) to request an immediate handover for the UE 102, similar to events 316A and 318A, respectively.

Whereas in the scenario FIG. 3A the T-MN 104B identifies the C-MN configuration indicated in the Handover Request message to determine 320A to release the C-MN configuration stored at the UE 102, in the scenario of FIG. 3B the T-MN 104B ignores (or discards) 320B the C-MN configuration indicated in the Handover Request message. Consequently, whereas in FIG. 3A the T-MN 104B generates a handover command message including a C-MN configuration to release field/IE, in FIG. 3B the T-MN 104B generates a handover command message excluding a C-MN configuration to release field/IE. The T-MN 104B then sends 322B a Handover Request Acknowledge message including the handover command message to the S-MN 104A in response to receiving 318B the Handover Request message.

In implementations in which the S-MN 104A does not have a direct interface with the T-MN 104B, the S-MN 104A, the CN 110, and the T-MN 104B may collectively perform a similar CN procedure as described above with respect to scenario 300A.

Upon receiving the handover command message (i.e., either from the CN 110 or T-MN 104B), the S-MN 104A transmits 324B the handover command message to the UE 102, causing the UE 102 to release 326B the stored C-MN configuration. In one implementation, the UE 102 is configured to release the stored C-MN configuration upon recognizing that the handover command message does not include a C-MN configuration to release field/IE. In some implementations, the UE 102 may also be configured to release the condition associated to the stored C-MN configuration upon recognizing that the handover command message does not include a C-MN configuration to release field/IE. In other implementations, the UE 102 releases the conditional configuration field/IE including the C-MN configuration and the condition upon recognizing that the handover command message does not include a C-MN configuration to release field/IE. In some implementations, the condition may be associated to at least one measurement configuration (e.g., MeasConfig IE) which the S-MN 104A configured to the UE 102 before transmitting the handover command message to the UE 102. The at least one measurement configuration is associated to a measurement identity (e.g., MeasId IE). In some implementations, the UE 102 may release the at least one measurement configuration upon recognizing that the handover command message does not include a C-MN configuration to release field/IE. In other implementations, the UE 102 does not release the at least one measurement configuration upon recognizing that the handover command message does not include a C-MN configuration to release field/IE. Instead, the UE 102 releases a measurement configuration in the at least one measurement configuration if the UE 102 identifies a measurement identity (associated to the measurement configuration) in a measurement identity to remove list field/IE (e.g., measIdToRemoveList) in the handover command message. That is, the T-MN 104B determines to release the measurement configuration in response to ignoring 320B the C-MN configuration.

The UE 102 then performs the immediate handover with the T-MN 104B, by performing 328B a random access procedure with the T-MN 104B via a T-PCell 124B, transmitting 330B a handover complete message during or after the random access procedure, and communicating 332B control signals and data with the MN 104B via the PCell 124B if the UE 102 successfully completes the random access procedure, similar to events 328A, 330A, and 332A, respectively. In some scenarios, the S-MN 104A can send 334B a Handover Cancel message to the C-MN 106B, causing the C-MN 106B to release the C-MN configuration, similar to event 334A.

Figure 4:
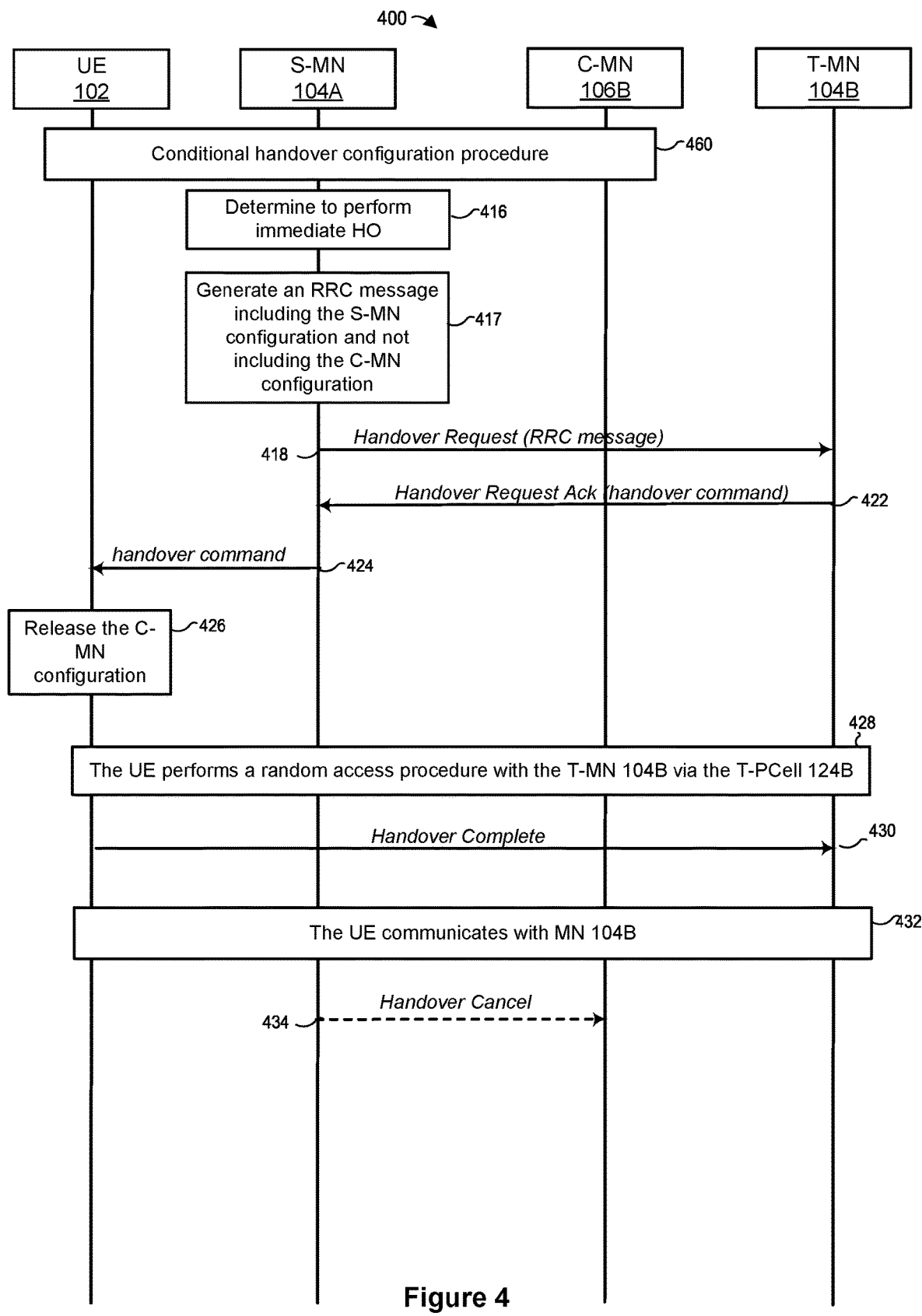
FIG. 4 is a messaging diagram of an example scenario in which the RAN excludes a conditional configuration for CHO in a Handover Request message to handle release of the conditional configuration at the UE.

In a scenario 400 of FIG. 4, the UE 102, S-MN 104A, and C-MN 106B collectively perform 460 the conditional handover configuration procedure, similar to event 360A.

At a later time, and before the UE 102 determines that the condition for handing over to C-MN 106B is satisfied, the S-MN 104A determines 416 to perform an immediate handover procedure with the T-MN 104B, similar to event 316A. Whereas in the scenario of FIG. 3A the S-MN 104A sends 318A a Handover Request message to the T-MN 104B, including the S-MN configuration and the C-MN configuration, in the scenario FIG. 4 the S-MN 104A generates 417 an RRC message (e.g., RRC reconfiguration message) including the S-MN configuration and excluding the C-MN configuration, and then sends 418, to the T-MN 104B, a Handover Request message including the RRC message. In some implementations, the S-MN 104A can include the RRC message in a HandoverPreparationInfo IE and include the HandoverPreparationInfo IE in the Handover Request message.

Consequently, whereas in FIG. 3A the T-MN 104B generates a handover command message including a C-MN configuration to release field/IE and sends 322A a Handover Request Acknowledge message including the handover command message to the S-MN 104A in response to receiving 318A the Handover Request message, in FIG. 4 the T-MN 104B generates a handover command message excluding a C-MN configuration to release field/IE and sends 422 a Handover Request Acknowledge message including the handover command message to the S-MN 104A in response to receiving 418 the Handover Request message.

When the S-MN 104A does not have a direct interface with the T-MN 104B, the S-MN 104A, the CN 110, and the T-MN 104B may collectively perform a similar CN procedure as described above with respect to scenario 300A.

Upon receiving the handover command message (i.e., either from the CN 110 or T-MN 104B), the S-MN 104A transmits 424 the handover command message to the UE 102, causing the UE 102 to release 426 the stored C-MN configuration, similar to event 326B.

The UE 102 then performs the immediate handover with the T-MN 104B, by performing 428 a random access procedure with the T-MN 104B via a T-PCell 124B, transmitting 430 a handover complete message during or after the random access procedure, and communicating 432 control signals and data with the MN 104B via the PCell 124B if the UE 102 successfully completes the random access procedure, similar to events 328B, 330B, and 332B, respectively. In some scenarios, the S-MN 104A can send 434 a Handover Cancel message to the C-MN 106B, causing the C-MN 106B to release the C-MN configuration, similar to event 334B.

Figure 5:
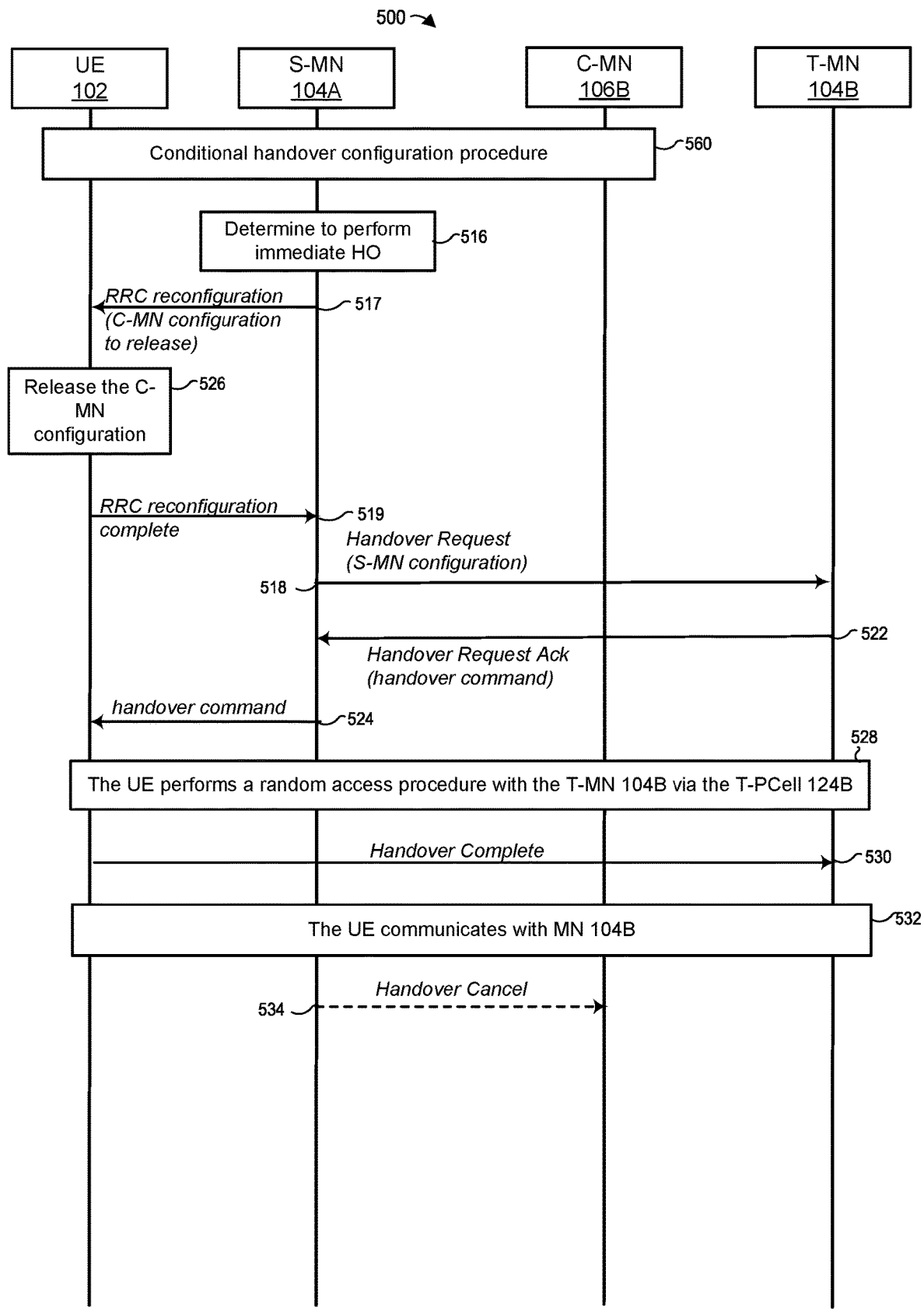
FIG. 5 is a messaging diagram of an example scenario in which the RAN includes an identification of the conditional configuration for CHO in an RRC reconfiguration message to handle release of the conditional configuration at the UE.

In a scenario 500 of FIG. 5, the UE 102, S-MN 104A, and C-MN 106B collectively perform 560 the conditional handover configuration procedure, similar to event 360A.

At a later time, and before the UE 102 determines that the condition for handing over to C-MN 106B is satisfied, the S-MN 104A determines 516 to perform an immediate handover procedure with the T-MN 104B, similar to event 416. Whereas in the scenario of FIG. 4 the S-MN 104A and T-MN 104B collectively perform immediate handover events 417, 418, 422, and 424 to cause the UE 102 to release 426 the stored C-MN configuration, in the scenario of FIG. 5 the S-MN 104A, prior to initiating the immediate handover procedure, sends 517, to the UE 102, an RRC reconfiguration message including the C-MN configuration to release field/IE, causing the UE 102 to release 526 the stored C-MN configuration. In response to receiving the RRC reconfiguration message, the UE 102 releases 526 the C-MN configuration and sends 519 an RRC reconfiguration complete message back to the S-MN 104A. In one implementation, the UE 102 can identify the configuration ID included in the C-MN configuration to release field/IE to release the C-MN configuration associated with the configuration ID. In some implementations, the UE 102 may also release the condition associated to the C-MN configuration if the UE 102 identifies the configuration ID included in the C-MN configuration to release field/IE. In other implementations, the UE 102 releases the conditional configuration field/IE including the C-MN configuration and the condition if the UE 102 identifies the configuration ID included in the C-MN configuration to release field/IE. In some implementations, the condition may be associated to at least one measurement configuration (e.g., MeasConfig IE) which the S-MN 104A configured to the UE 102 before transmitting the RRC reconfiguration message to the UE 102. The at least one measurement configuration is associated to a measurement identity (e.g., MeasId IE). In some implementations, the UE 102 may release the at least one measurement configuration if the UE 102 identifies the configuration ID included in the C-MN configuration to release field/IE. In other implementations, the UE 102 does not release the at least one measurement configuration if the UE 102 identifies the configuration ID included in the C-MN configuration to release field/IE. Instead, the UE 102 releases a measurement configuration in the at least one measurement configuration if the UE 102 identifies a measurement identity (associated to the measurement configuration) in a measurement identity to remove list field/IE (e.g., measIdToRemoveList) in the RRC reconfiguration message. The S-MN 104A may determine to release the measurement configuration in response to determining 516 to perform immediate handover, and as a result, include the measurement identity to remove list field/IE in the RRC reconfiguration message.

In turn, the S-MN 104A initiates the immediate handover procedure by sending 518 a Handover Request message including the S-MN configuration to the T-MN 104B to request an immediate handover for the UE 102, similar to event 418. In some implementations, the S-MN 104A can include the S-MN configuration in a HandoverPreparationInfo IE and include the HandoverPreparationInfo IE in the Handover Request message. In some implementations, the S-MN 104A can include the S-MN configuration in an RRC message (e.g., RRC reconfiguration message) in a HandoverPreparationInfo IE and include the HandoverPreparationInfo IE in the Handover Request message.

In response to receiving the Handover Request message, the T-MN 104B generates a handover command message excluding a C-MN configuration to release field/IE, and sends 522 a Handover Request Acknowledge message including the handover command message to the S-MN 104A, similar to event 422. In other implementation, the event 518 may occur before event 519 or 517 so that the event 518 may not be in response to event 519.

In implementations in which the S-MN 104A does not have a direct interface with the T-MN 104B, the S-MN 104A, the CN 110, and the T-MN 104B may collectively perform a similar CN procedure as described above with respect to scenario 300A.

In turn, upon receiving the handover command message (i.e., either from the CN 110 or T-MN 104B), the S-MN 104A transmits 524 the handover command message to the UE 102. The UE 102 then performs the immediate handover with the T-MN 104B, by performing 528 a random access procedure with the T-MN 104B via a T-PCell 124B, transmitting 530 a handover complete message during or after the random access procedure, and communicating 532 control signals and data with the MN 104B via the PCell 124B if the UE 102 successfully completes the random access procedure, similar to events 428, 430, and 432, respectively. In some scenarios, the S-MN 104A can send 534 a Handover Cancel message to the C-MN 106B, causing the C-MN 106B to release the C-MN configuration, similar to event 434.

Referring to FIGS. 6A through 8, the RAN in these scenarios initially provides a conditional configuration for CSAC to the UE 102, and later determines to release the conditional configuration stored at the UE 102 during an immediate handover procedure.

Figure 6A:
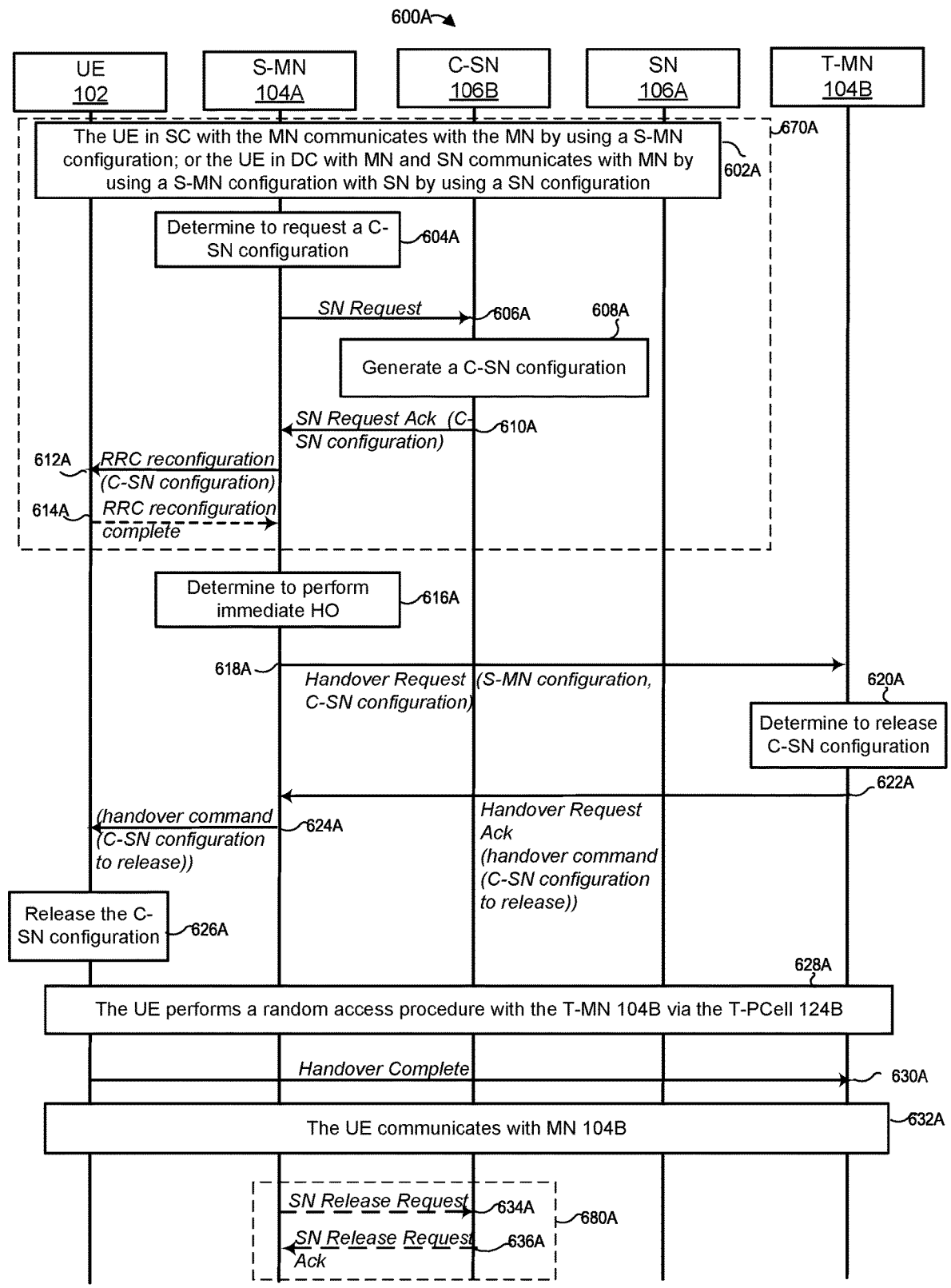
FIGS. 6A and 6B are messaging diagrams of example scenarios in which the RAN includes a conditional configuration for CSAC in a Handover Request message to handle release of the conditional configuration at the UE.

Referring to FIG. 6A, in a scenario 600A, the base station 104A operates as an S-MN for the UE 102, the base station 106A operates as an SN for the UE 102, the base station 106B operates as a C-SN for the UE 102, and the base station 104B operates as a T-MN for the UE 102.

Initially, the UE 102 in SC communicates 602A data (e.g., UL data PDUs and/or DL data PDUs) with the S-MN 104A via a primary cell (e.g., PCell 124A) by using an S-MN configuration. Alternatively, the UE 102 in DC communicates 602A data with the S-MN 104A via the PCell 124A by using the S-MN configuration and with SN 106A via the PSCell 126A by using an SN configuration.

At a later time, upon determining to perform a CSAC procedure for the C-SN 106B and the UE 102 to communicate, the S-MN 104A determines 604A to request, from the C-SN 106B, a conditional configuration (e.g., C-SN configuration) to provide to the UE 102, e.g., blindly or in response to detecting a suitable event. For example, the determination 604A may occur in response to the S-MN 104A receiving one or more measurement results from the UE 102 directly (e.g., via an SRB established between the UE 102 and the S-MN 104A or via a physical control channel) that are above (or below) one or more predetermined thresholds, or from the S-MN 104A having analyzed measurements on signals, control channels or data channels received from the UE 102. In another example, the suitable event can be that the UE 102 is moving toward the C-SN 106B.

After determining 604A to request the C-SN configuration, the S-MN 104A transmits 606A an SN Request message to the C-SN 106B. In response to the SN Request message, the C-SN 106B generates 608A a C-SN configuration, which includes information that would enable the UE 102 to communicate with the C-SN 106B via a candidate cell (which may be called a candidate PSCell (C-PSCell)). The C-SN 106B includes the C-SN configuration in an SN Request Acknowledge message for the UE 102, and subsequently transmits 610A the SN Request Acknowledge message to the S-MN 104A in response to the SN Request message. In some implementations, the SN Request message can be an SN Addition Request or SN Modification Request message, and the SN Request Acknowledge message can be an SN Addition Request Acknowledge or SN Modification Request Acknowledge message.

The S-MN 104A transmits 612A an RRC reconfiguration message including the C-SN configuration to the UE 102, which in turn optionally transmits 614A an RRC reconfiguration complete message to the S-MN 104A in response to receiving the RRC reconfiguration message. In some implementations, the S-MN 104A may include the C-SN configuration message in a RRC container message and then include the RRC container message in the RRC reconfiguration message. In some implementations, the S-MN 104A includes, in the C-SN configuration, the RRC container message or in the RRC reconfiguration message, a condition (or conditions) for the UE 102 to detect, so that the UE 102 can communicate with the C-SN 106B if the condition is satisfied. The S-MN 104A can include the C-SN configuration in a conditional configuration field or IE of the RRC reconfiguration message. The S-MN 104A can further include a configuration ID associated to the C-SN configuration in the conditional configuration field/IE, so that the UE 102 can identify and store the C-SN configuration. The S-MN 104A may allocate the configuration ID, or receive the configuration ID from the C-SN 106B. The events 602A, 604A, 606A, 608A, 610A, 612A, 614A are collectively referred to in FIG. 6A as the CSAC configuration procedure 670A.

Later on, and before the UE 102 determines that the condition for the conditional SN change is satisfied, the S-MN 104A determines 616A to perform an immediate handover procedure with the T-MN 104B, e.g., blindly or in response to detecting a suitable event, for the T-MN 104B and the UE 102 to communicate. For example, the determination 616A may occur in response to the S-MN 104A receiving one or more measurement results from the UE 102 that are above (or below) one or more predetermined thresholds, or from the S-MN 104A having analyzed measurements on signals, control channels or data channels received from the UE 102. In another example, the suitable event can be that the UE 102 is moving toward the T-MN 104B.

In response to the determination, the S-MN 104A sends 618A a Handover Request message to the T-MN 104B via an interface (e.g., X2/Xn interface) to request an immediate handover for the UE 102. The Handover Request message includes the S-MN configuration, so that the T-MN 104B is aware of any pre-existing configurations (e.g., S-MN configuration) known by the UE 102 to determine additional configuration(s) still needed by the UE 102 when performing an immediate handover procedure to switch from the S-MN 104A to the T-MN 104B. In addition, because T-MN 104B is unaware of the C-SN configuration stored at the UE 102, the S-MN 104A also includes the C-SN configuration in the Handover Request message, so that upon receiving the Handover Request message, the T-MN 104B is aware of the C-SN configuration stored at the UE 102. In some implementations, the S-MN 104A can include the configuration ID associated to the C-SN configuration in the Handover Request message. In some implementations, the S-MN 104A can include the C-SN configuration and the S-MN configuration in a HandoverPreparationInfo IE (or RRC inter-node message) and include the HandoverPreparationInfo IE in the Handover Request message. In other implementations, the S-MN 104A may include the C-SN configuration and the S-MN configuration in an RRC message (e.g., RRC reconfiguration message), include the RRC message in a HandoverPreparationInfo IE, and then include the HandoverPreparationInfo IE in the Handover Request message. In some implementations, the S-MN 104A may include the configuration ID associated to the C-SN configuration in the RRC message or in the HandoverPreparationInfo IE.

Upon identifying the C-SN configuration indicated in the Handover Request message, the T-MN 104B determines 620A to release the C-SN configuration stored at the UE 102. In response to the determination, the T-MN 104B generates a handover command message including a C-SN configuration to release field/IE. The handover command message also includes one or more random access configurations needed by the UE 102 to handover to the T-MN 104B. In some implementations, the handover command message may have additional fields, such as a mobility field (e.g., mobilityControlInfo field or a reconfigurationWithSync field). The T-MN 104B then sends 622A a Handover Request Acknowledge message including the handover command message to the S-MN 104A in response to receiving 618A the Handover Request message. In some implementations, the T-MN 104B can include the configuration ID associated to the C-SN configuration in the C-SN configuration to release field/IE.

In implementations in which the S-MN 104A does not have a direct interface with the T-MN 104B, the S-MN 104A, the CN 110, and the T-MN 104B may collectively perform a similar CN procedure as described above with respect to scenario 300A.

In turn, upon receiving the handover command message (i.e., either from the CN 110 or T-MN 104B), the S-MN 104A transmits 624A the handover command message to the UE 102, causing the UE 102 to release 626A the stored C-SN configuration. In one implementation, the UE 102 can identify the configuration ID included in the C-SN configuration to release field/IE to release the C-SN configuration associated with the configuration ID. In some implementations, the UE 102 may also release the condition associated to the C-SN configuration if the UE 102 can identify the configuration ID included in the C-SN configuration to release field/IE. In other implementations, the UE 102 releases the conditional configuration field/IE including the C-SN configuration and the condition if the UE 102 can identify the configuration ID included in the C-SN configuration to release field/IE. In some implementations, the condition may be associated to at least one measurement configuration (e.g., MeasConfig IE) which the S-MN 104A configured to the UE 102 before transmitting the handover command message to the UE 102. The at least one measurement configuration is associated to a measurement identity (e.g., MeasId IE). In some implementations, the UE 102 may release the at least one measurement configuration if the UE 102 can identify the configuration ID included in the C-SN configuration to release field/IE. In other implementations, the UE 102 does not release the at least one measurement configuration if the UE 102 identifies the configuration ID included in the C-SN configuration to release field/IE. Instead, the UE 102 releases a measurement configuration in the at least one measurement configuration if the UE 102 identifies a measurement identity (associated to the measurement configuration) in a measurement identity to remove list field/IE (e.g., measIdToRemoveList) in the handover command message. The T-MN 104B may determine to release the measurement configuration in response to determining 620A to release the C-SN configuration, and as a result, include the measurement identity to remove list field/IE in the handover command message. In some scenarios, if the UE 102 initiated a random access procedure upon detecting that the condition is met in accordance with the C-SN configuration while receiving 624A the handover command, the UE can abort the random access procedure in response to the handover command.

The UE 102 also performs the immediate handover with the T-MN 104B in response to the handover command message. In performing the handover, the UE 102 performs 628A a random access procedure with the T-MN 104B via a T-PCell 124B, e.g., by using one or more random access configurations in the handover command message. The UE 102 transmits 630A a handover complete message during or after the random access procedure. If the UE 102 successfully completes the random access procedure, the UE 102 communicates 632A control signals and data with the MN 104B via the PCell 124B.

In some scenarios, the S-MN 104A can send 634A an SN Release Request message to the C-SN 106B, in response to the S-MN 104A determining 616A to perform immediate handover or receiving 622A the Handover Request Acknowledge message, causing the C-SN 106B to release the C-SN configuration. To this end, the C-SN 106B need not waste its resources to keep the C-SN configuration, as the UE 102 is no longer configured to use the C-SN configuration to communicate with the C-SN 106B. The C-SN 106B can send 636A an SN Release Request Acknowledge message back to the S-MN 104A. The events 634A and 636A are collectively referred to in FIG. 6A as the conditional SN release procedure 680A.

In some implementations, if the S-MN 104A is an eNB or a next generation eNB (ng-eNB), the RRC reconfiguration message and the RRC reconfiguration complete message can be an RRCConnectionReconfiguration message and an RRCConnectionReconfigurationComplete message respectively. If the S-MN 104A is a gNB, the RRC reconfiguration message and the RRC reconfiguration complete message can be an RRCReconfiguration message and an RRCReconfigurationComplete message respectively.

In some implementations, if the S-MN 104A is an eNB or ng-eNB, the handover command message and the handover complete message can be an RRCConnectionReconfiguration message and an RRCConnectionReconfigurationComplete message respectively. If the S-MN 104A is an gNB, the handover command message and the handover complete message can be an RRCReconfiguration message and an RRCReconfigurationComplete message respectively.

In some implementations, the C-SN configuration can be a complete and self-contained configuration (i.e. full configuration). The C-SN configuration may include a full configuration indication (an IE or a field) indicating that the C-SN configuration is a full configuration. The UE 102 can use the C-SN configuration (i.e. full configuration) to communicate with the C-SN 106B without referring to the SN configuration if the UE 102 connects to the C-SN 106B. In other implementations, the C-SN configuration is a delta configuration, in that the C-SN configuration can include one or more configurations "on top of" the SN configuration (i.e., one or more configurations not included in the SN configuration). The UE 102 can use the C-SN configuration (i.e. delta configuration) together with the SN configuration to communicate with the C-SN 106B if the UE 102 connects to the C-SN 106B.

In some implementations, the C-SN configuration can include multiple configuration parameters for the UE 102 to communicate with the C-SN 106B via a C-PSCell 126B. The multiple configuration parameters may configure radio resources for the UE 102 to communicate with the C-SN 106B via the C-PSCell 126B and zero, one, or more candidate secondary cells (C-SCells) of the C-SN 106B. The multiple configuration parameters may configure zero, one, or more radio bearers. The one or more radio bearers can include an SRB and/or DRB(s). Similarly, the SN configuration can include multiple configuration parameters for the UE 102 to communicate with the SN 106A via the PSCell 126A and zero, one, or more secondary cells (SCells) of the SN 106A. The multiple configuration parameters may configure radio resources for the UE 102 to communicate with the SN 106A via the PSCell 126A and zero, one, or more SCells of the SN 106A. The multiple configuration parameters may configure zero, one, or more radio bearers. The one or more radio bearers can include an SRB and/or DRB(s).

In some implementations, the C-SN configuration can include a group configuration (CellGroupConfig) IE that configures the C-PSCell 126B and may configure zero, one, or more C-SCells of the C-SN 106B. In one implementation, the C-SN configuration can be a RRCReconfiguration message, RRCReconfiguration-IEs or the CellGroupConfig IE conforming to 3GPP TS 38.331. The full configuration indication may be a field or an IE conforming to 3GPP TS 38.331. In other implementations, the C-SN configuration can include an SCG-ConfigPartSCG-r12 IE that configures the C-PSCell 126B and may configure zero, one, or more C-SCells of the C-SN 106B. In one implementation, the C-SN configuration can be a RRCConnectionReconfiguration message, RRCConnectionReconfiguration-IEs or the ConfigPartSCG-r12 IE conforming to 3GPP TS 36.331. The full configuration indication may be a field or an IE conforming to 3GPP TS 36.331. In another implementation, the C-MN configuration may be included in a conditional configuration field or IE and the conditional configuration field/IE can be further included in an RRCReconfiguration message, RRCReconfiguration-IEs or the CellGroupConfig IE conforming to 3GPP TS 38.331. In other implementations, the C-MN configuration can be an RRCConnectionReconfiguration message, an RRCConnectionReconfiguration-IEs or the ConfigPartSCG-r12 IE conforming to 3GPP TS 36.331.

In some implementations, the SN configuration can include a CellGroupConfig IE that configures the PSCell 126A and may configure zero, one, or more SCells of the SN 106A. In one implementation, the SN configuration can be an RRCReconfiguration message, RRCReconfiguration-IEs or the CellGroupConfig IE conforming to 3GPP TS 38.331. In other implementations, the SN configuration can include an SCG-ConfigPartSCG-r12 IE that configures the PSCell 126A and may configure zero, one, or more SCells of the SN 106A. In one implementation, the SN configuration can be a RRCConnectionReconfiguration message, RRCConnectionReconfiguration-IEs or the ConfigPartSCG-r12 IE conforming to 3GPP TS 36.331.

Figure 6B:
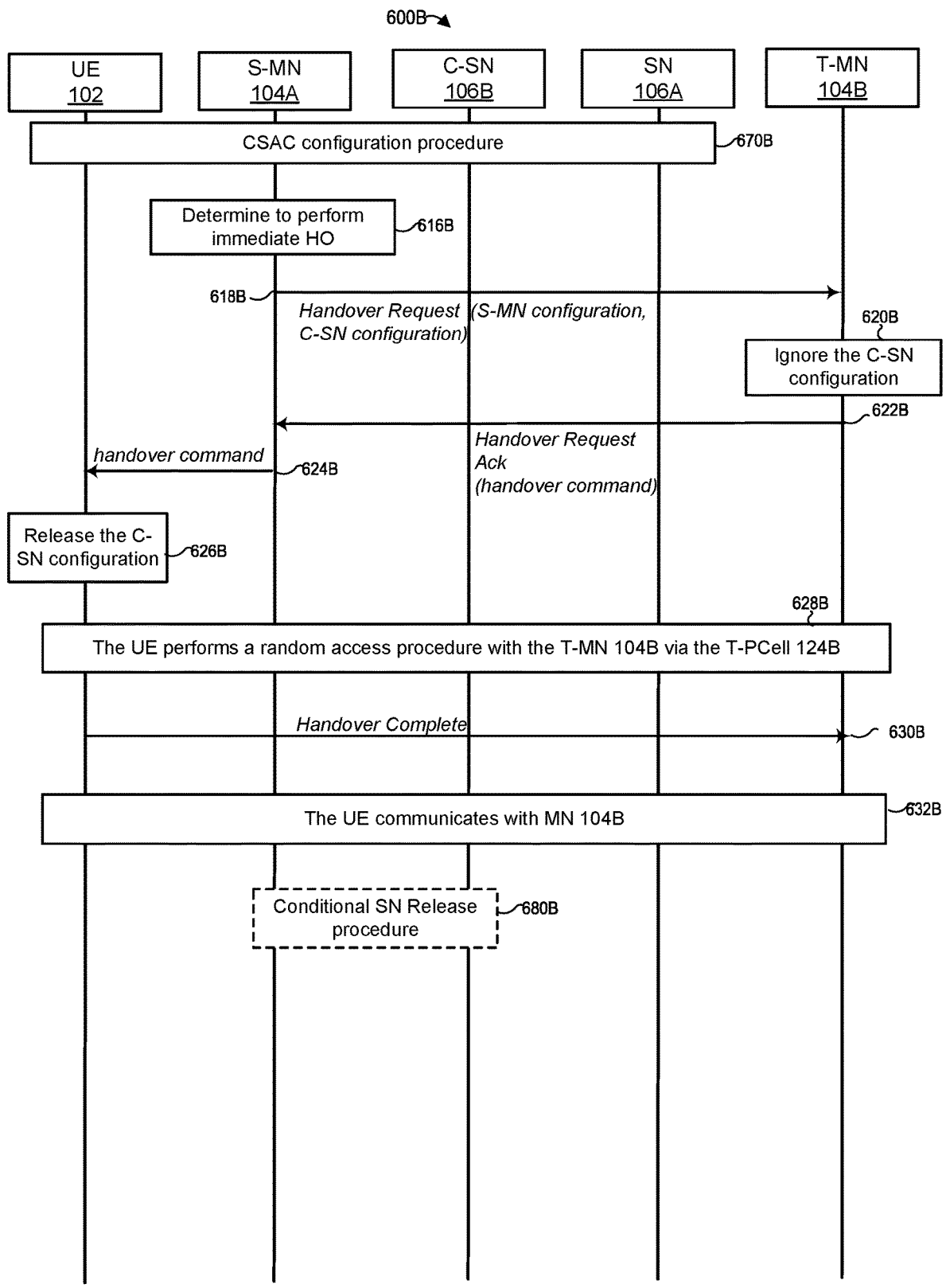

In FIG. 6B, in a scenario 600B, the UE 102, S-MN 104A, C-SN 106B, and SN 106A collectively perform 670B the CSAC configuration procedure, similar to event 670A.

Later on, and before the UE 102 determines that the condition for the conditional SN change is satisfied, the S-MN 104A determines 616B to perform an immediate handover procedure with the T-MN 104B, and subsequently sends 618B a Handover Request message to the T-MN 104B via an interface (e.g., X2/Xn interface) to request an immediate handover for the UE 102, similar to events 616A and 618A, respectively.

Whereas in FIG. 6A the T-MN 104B identifies the C-SN configuration indicated in the Handover Request message to determine 620A to release the C-SN configuration stored at the UE 102, in FIG. 6B the T-MN 104B ignores (or discards) 620B the C-SN configuration indicated in the Handover Request message. Consequently, whereas in FIG. 6A the T-MN 104B generates a handover command message including a C-SN configuration to release field/IE, in FIG. 6B the T-MN 104B generates a handover command message excluding a C-SN configuration to release field/IE. The T-MN 104B then sends 622B a Handover Request Acknowledge message including the handover command message to the S-MN 104A in response to receiving 618B the Handover Request message.

In implementations in which the S-MN 104A does not have a direct interface with the T-MN 104B, the S-MN 104A, the CN 110, and the T-MN 104B may collectively perform a similar CN procedure as described above with respect to scenario 300A.

In turn, upon receiving the handover command message (i.e., either from the CN 110 or T-MN 104B), the S-MN 104A transmits 624B the handover command message to the UE 102, causing the UE 102 to release 626B the stored C-SN configuration. In one implementation, the UE 102 is configured to release the stored C-SN configuration upon recognizing that the handover command message does not include a C-SN configuration to release field/IE. In some implementations, the UE 102 may also be configured to release the condition associated to the stored C-SN configuration upon recognizing that the handover command message does not include a C-SN configuration to release field/IE. In other implementations, the UE 102 releases the conditional configuration field/IE including the C-SN configuration and the condition upon recognizing that the handover command message does not include a C-SN configuration to release field/IE. In some implementations, the condition may be associated to at least one measurement configuration (e.g., MeasConfig IE) which the S-MN 104A configured to the UE 102 before transmitting the handover command message to the UE 102. The at least one measurement configuration is associated to a measurement identity (e.g., MeasId IE). In some implementations, the UE 102 may release the at least one measurement configuration upon recognizing that the handover command message does not include a C-SN configuration to release field/IE. In other implementations, the UE 102 does not release the at least one measurement configuration upon recognizing that the handover command message does not include a C-SN configuration to release field/IE. Instead, the UE 102 releases a measurement configuration in the at least one measurement configuration if the UE 102 identifies a measurement identity (associated to the measurement configuration) in a measurement identity to remove list field/IE (e.g., measIdToRemoveList) in the handover command message. The T-MN 104B may determine to release the measurement configuration in response to ignoring 620B the C-SN configuration, and as a result, include the measurement identity to remove list field/IE in the handover command message.

The UE 102 then performs the immediate handover with the T-MN 104B, by performing 628B a random access procedure with the T-MN 104B via a T-PCell 124B, transmitting 630B a handover complete message during or after the random access procedure, and communicating 632B control signals and data with the MN 104B via the PCell 124B if the UE 102 successfully completes the random access procedure, similar to events 628A, 630A, and 632A, respectively. In some scenarios, the S-MN 104A and C-SN 106B collectively perform 680B the conditional SN release procedure, similar to event 680A, causing the C-SN 106B to release the C-SN configuration.

Figure 7:
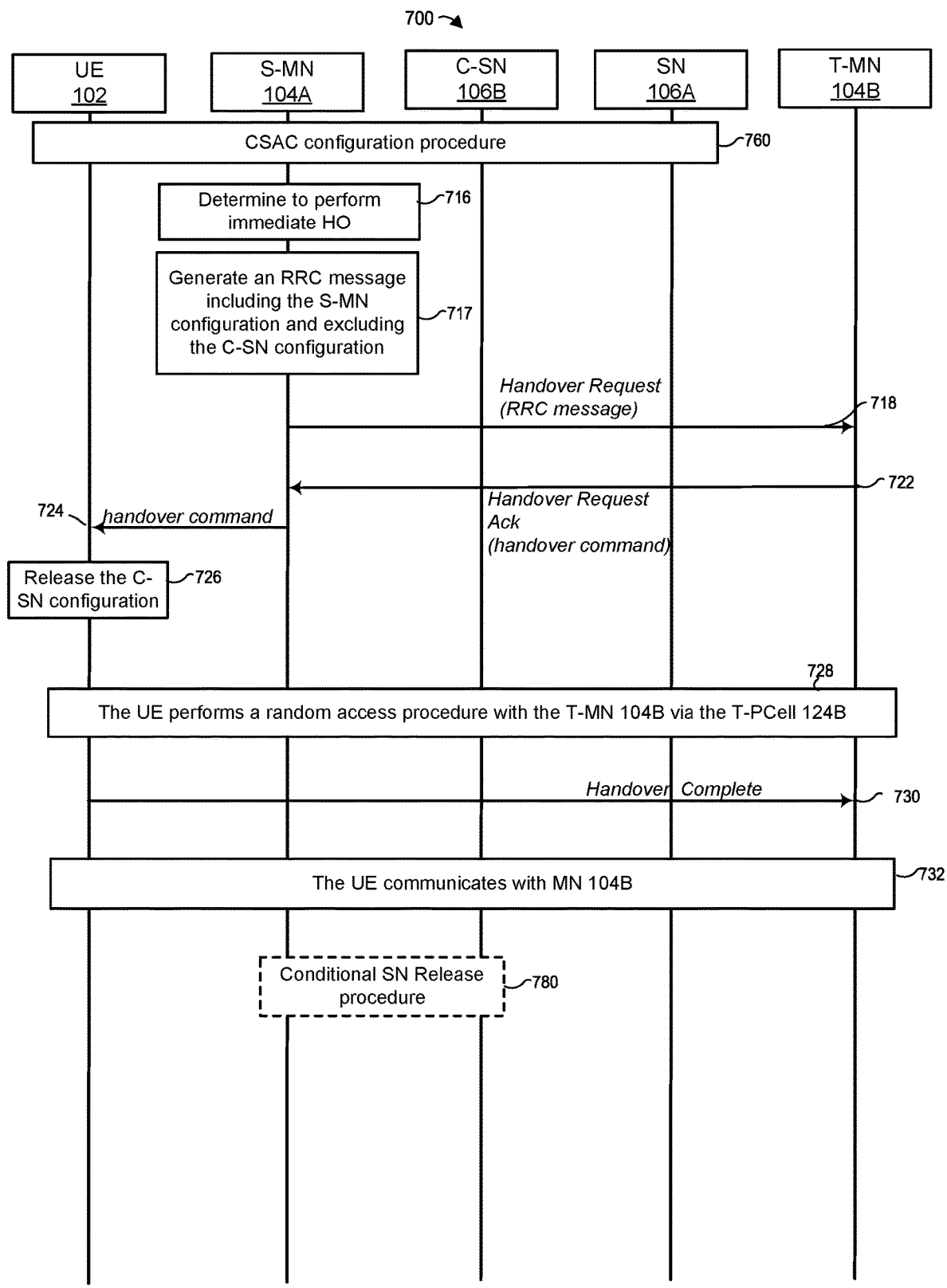
FIG. 7 is a messaging diagram of an example scenario in which the RAN excludes a conditional configuration for CSAC in a Handover Request message to handle release of the conditional configuration at the UE.

In FIG. 7, in a scenario 700, the UE 102, S-MN 104A, C-SN 106B, and SN 106A collectively perform 760 the CSAC configuration procedure, similar to event 670A.

Later on, and before the UE 102 determines that the condition for the conditional SN change is satisfied, the S-MN 104A determines 716 to perform an immediate handover procedure with the T-MN 104B, similar to event 616A. Whereas in FIG. 6A the S-MN 104A sends 618A, to the T-MN 104B, a Handover Request message including the S-MN configuration and the C-SN configuration, in FIG. 7 the S-MN 104A generates 717 an RRC message (e.g., RRC reconfiguration message) including the S-MN configuration and excluding the C-SN configuration, and then sends 718, to the T-MN 104B, a Handover Request message including the RRC message. In some implementations, the S-MN 104A can include the RRC message in a HandoverPreparationInfo IE and include the HandoverPreparationInfo IE in the Handover Request message.

Consequently, whereas in FIG. 6A the T-MN 104B generates a handover command message including a C-SN configuration to release field/IE and sends 622A a Handover Request Acknowledge message including the handover command message to the S-MN 104A in response to receiving 618A the Handover Request message, in FIG. 7 the T-MN 104B generates a handover command message excluding a C-SN configuration to release field/IE and sends 722 a Handover Request Acknowledge message including the handover command message to the S-MN 104A in response to receiving 718 the Handover Request message.

In implementations in which the S-MN 104A does not have a direct interface with the T-MN 104B, the S-MN 104A, the CN 110, and the T-MN 104B may collectively perform a similar CN procedure as described above with respect to scenario 300A.

In turn, upon receiving the handover command message (i.e., either from the CN 110 or T-MN 104B), the S-MN 104A transmits 724 the handover command message to the UE 102, causing the UE 102 to release 726 the stored C-SN configuration, similar to event 626B.

The UE 102 then performs the immediate handover with the T-MN 104B, by performing 728 a random access procedure with the T-MN 104B via a T-PCell 124B, transmitting 730 a handover complete message during or after the random access procedure, and communicating 732 control signals and data with the MN 104B via the PCell 124B if the UE 102 successfully completes the random access procedure, similar to events 628B, 630B, and 632B, respectively. In some scenarios, the S-MN 104A and C-SN 106B collectively perform 780 the conditional SN release procedure, similar to event 680B, causing the C-SN 106B to release the C-SN configuration.

Figure 8:
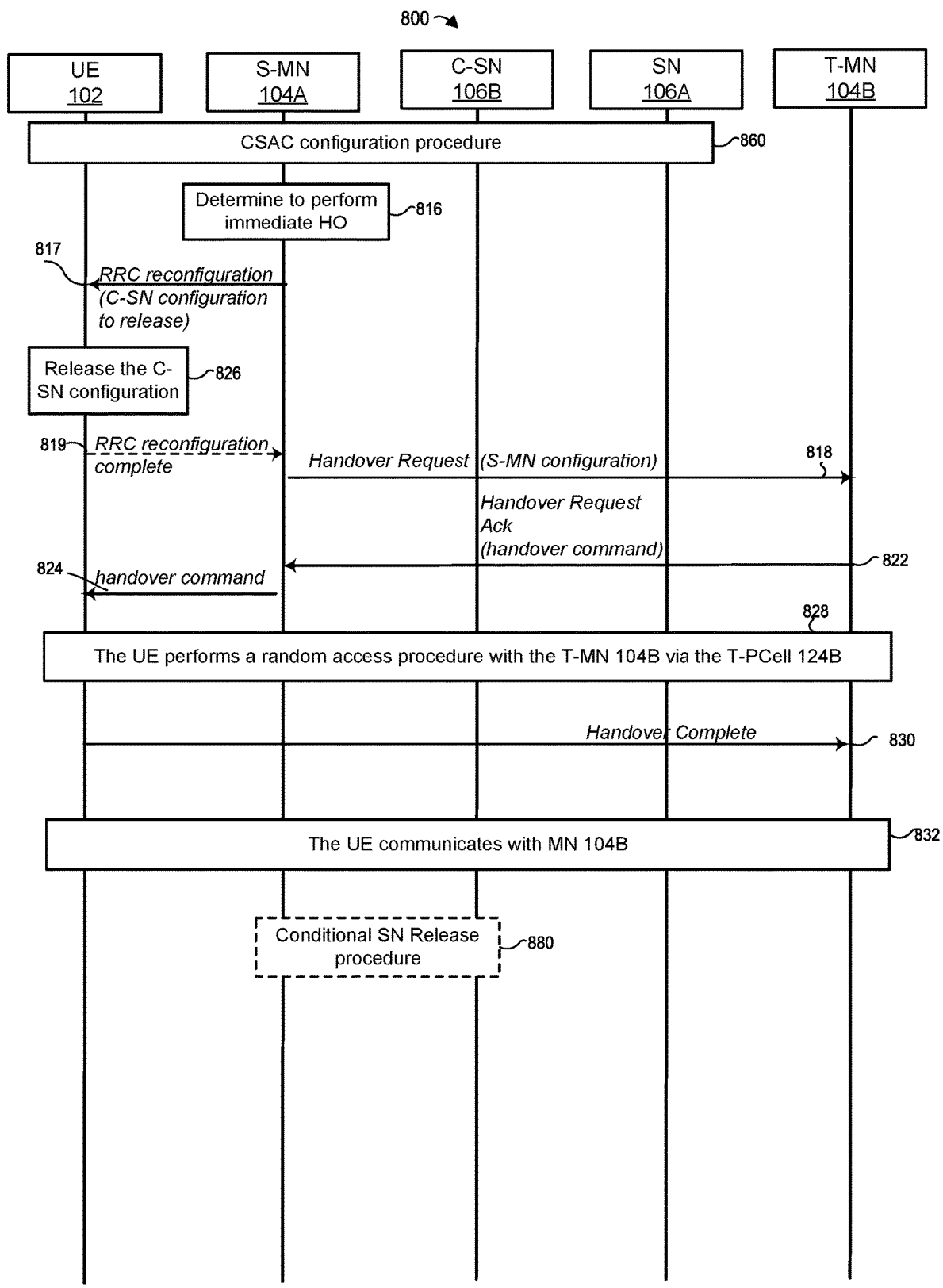
FIG. 8 is a messaging diagram of an example scenario in which the RAN includes an identification of the conditional configuration for CSAC in an RRC reconfiguration message to handle release of the conditional configuration at the UE.

In FIG. 8, in a scenario 800, the UE 102, S-MN 104A, C-SN 106B, and SN 106A collectively perform 860 the CSAC configuration procedure, similar to event 670A.

Later on, and before the UE 102 determines that the condition for the conditional SN change is satisfied, the S-MN 104A determines 816 to perform an immediate handover procedure with the T-MN 104B, similar to event 716. Whereas in FIG. 7 the S-MN 104A and T-MN 104B collectively perform immediate handover events 717, 718, 722, and 724 to cause the UE 102 to release 726 the stored C-SN configuration, in FIG. 8 the S-MN 104A, prior to initiating the immediate handover procedure, sends 817, to the UE 102, an RRC reconfiguration message including the C-SN configuration to release field/IE, causing the UE 102 to release 826 the stored C-SN configuration. In response to receiving the RRC reconfiguration message, the UE 102 releases 826 the C-SN configuration and sends 819 an RRC reconfiguration complete message back to the S-MN 104A. In one implementation, the UE 102 can identify the configuration ID included in the C-SN configuration to release field/IE to release the C-SN configuration associated with the configuration ID. In some implementations, the UE 102 may also release the condition associated to the C-SN configuration if the UE 102 identifies the configuration ID included in the C-SN configuration to release field/IE. In other implementations, the UE 102 releases the conditional configuration field/IE including the C-SN configuration and the condition if the UE 102 identifies the configuration ID included in the C-SN configuration to release field/IE. In some implementations, the condition may be associated to at least one measurement configuration (e.g., MeasConfig IE) which the S-MN 104A configured to the UE 102 before transmitting the RRC reconfiguration message to the UE 102. The at least one measurement configuration is associated to a measurement identity (e.g., MeasId IE). In some implementations, the UE 102 may release the at least one measurement configuration if the UE 102 identifies the configuration ID included in the C-SN configuration to release field/IE. In other implementations, the UE 102 does not release the at least one measurement configuration if the UE 102 identifies the configuration ID included in the C-SN configuration to release field/IE. Instead, the UE 102 releases a measurement configuration in the at least one measurement configuration if the UE 102 identifies a measurement identity (associated to the measurement configuration) in a measurement identity to remove list field/IE (e.g., measIdToRemoveList) in the RRC reconfiguration message. The S-MN 104A may determine to release the measurement configuration in response to determining 816 to perform the immediate handover, and as a result, include the measurement identity to remove list field/IE in the RRC reconfiguration message.

In turn, the S-MN 104A initiates the immediate handover procedure by sending 818 a Handover Request message including the S-MN configuration to the T-MN 104B to request an immediate handover for the UE 102, similar to event 718. In some implementations, the S-MN 104A can include the S-MN configuration in a HandoverPreparationInfo IE and include the HandoverPreparationInfo IE in the Handover Request message. In some implementations, the S-MN 104A can include the S-MN configuration in an RRC message (e.g., RRC reconfiguration message) in a HandoverPreparationInfo IE and include the HandoverPreparationInfo IE in the Handover Request message.

In response to receiving the Handover Request message, the T-MN 104B generates a handover command message excluding a C-SN configuration to release field/IE, and sends 822 a Handover Request Acknowledge message including the handover command message to the S-MN 104A, similar to event 722. In other implementation, the event 818 may occur before event 819 or 817 so that the event 818 may not be in response to event 819.

In implementations in which the S-MN 104A does not have a direct interface with the T-MN 104B, the S-MN 104A, the CN 110, and the T-MN 104B may collectively perform a similar CN procedure as described above with respect to scenario 300A.

In turn, upon receiving the handover command message (i.e., either from the CN 110 or T-MN 104B), the S-MN 104A transmits 824 the handover command message to the UE 102. The UE 102 then performs the immediate handover with the T-MN 104B, by performing 828 a random access procedure with the T-MN 104B via a T-PCell 124B, transmitting 830 a handover complete message during or after the random access procedure, and communicating 832 control signals and data with the MN 104B via the PCell 124B if the UE 102 successfully completes the random access procedure, similar to events 728, 730, and 732, respectively. In some scenarios, the S-MN 104A and C-SN 106B collectively perform 880 the conditional SN release procedure, similar to event 780, causing the C-SN 106B to release the C-SN configuration.

Figure 9A:
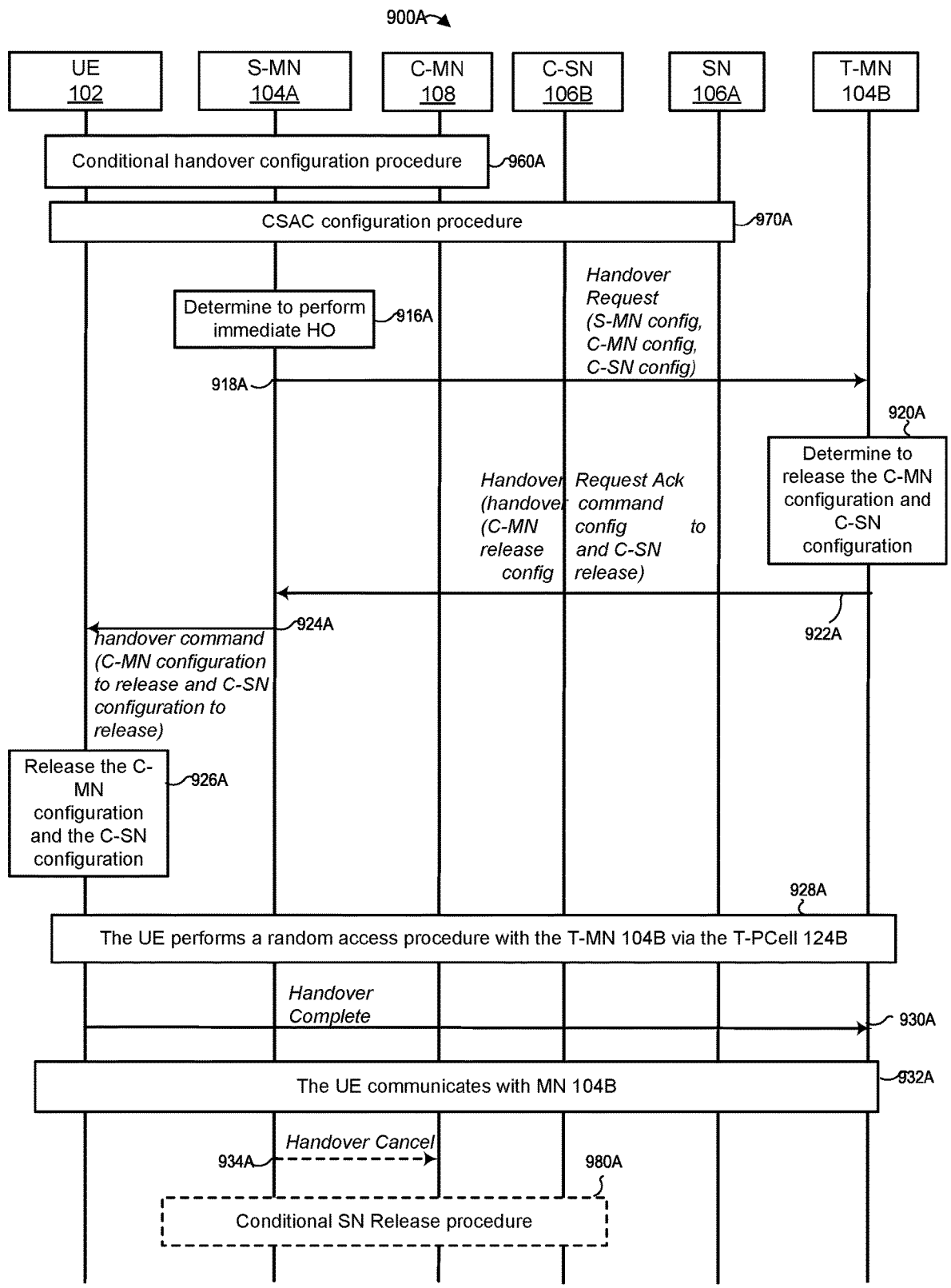
FIGS. 9A and 9B are messaging diagrams of example scenarios in which the RAN includes a conditional configuration for CHO and a conditional configuration for CSAC in a Handover Request message to handle release of the both conditional configurations at the UE.
Figure 9B:
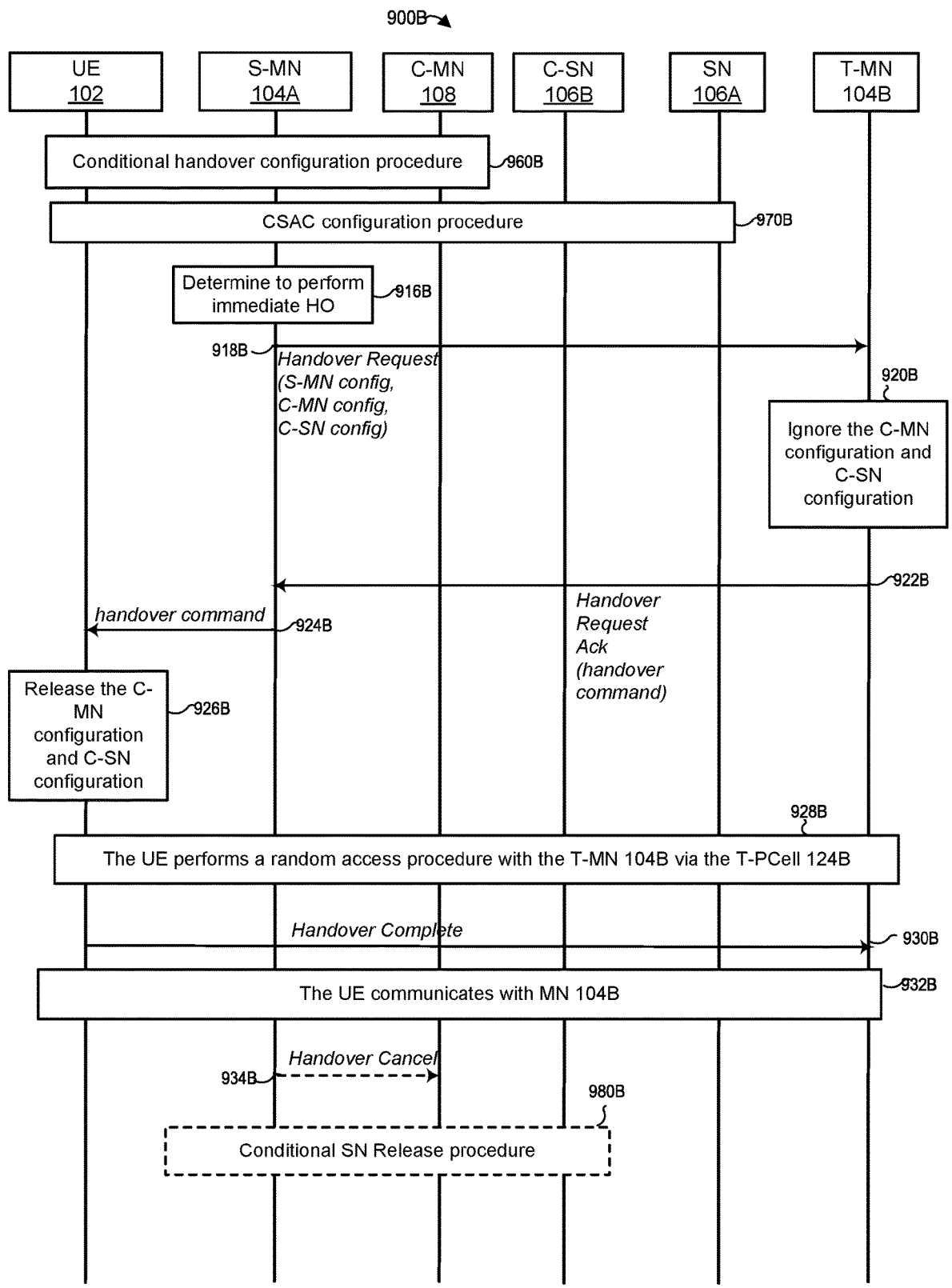

Referring to FIGS. 9A and 9B, scenarios are shown in which the RAN initially provides a conditional configuration for CHO and a conditional configuration for CSAC to the UE 102, and later determines to release both conditional configurations stored at the UE 102 during an immediate handover procedure.

In FIG. 9A, in a scenario 900A, the UE 102, S-MN 104A, and C-MN 108 collectively perform 960A the conditional handover configuration procedure, similar to event 360A. The UE 102, S-MN 104A, C-SN 106B, and SN 106A collectively perform 970A the CSAC configuration procedure, similar to event 670A.

Later on, and before the UE 102 determines that the condition for handing over to C-MN 108 and/or the condition for the conditional SN change is satisfied, the S-MN 104A determines 916A to perform an immediate handover procedure with the T-MN 104B, and subsequently sends 918A a Handover Request message to the T-MN 104B via an interface (e.g., X2/Xn interface) to request an immediate handover for the UE 102, similar to events 316A, 616A, and 318A, 618A, respectively. The Handover Request message includes the S-MN configuration, so that the T-MN 104B is aware of any pre-existing configurations (e.g., S-MN configuration) known by the UE 102 to determine additional configuration(s) still needed by the UE 102 when performing an immediate handover procedure to switch from the S-MN 104A to the T-MN 104B. In addition, because T-MN 104B is unaware of the C-MN configuration and C-SN configuration stored at the UE 102, the S-MN 104A also includes the C-MN configuration and C-SN configuration in the Handover Request message, so that upon receiving the Handover Request message, the T-MN 104B is aware of the C-MN configuration and C-SN configuration stored at the UE 102.

Upon identifying the C-MN configuration and C-SN configuration indicated in the Handover Request message, the T-MN 104B determines 920A to release the C-MN configuration and C-SN configuration stored at the UE 102, similar to events 320A and 620A.

In response to the determination, the T-MN 104B generates a handover command message including a C-MN configuration to release field/IE, C-SN configuration to release field/IE, and one or more random access configurations needed by the UE 102 to handover to the T-MN 104B. The T-MN 104B then sends 922A a Handover Request Acknowledge message including the handover command message to the S-MN 104A in response to receiving 918A the Handover Request message, similar to events 322A and 622A. In implementations in which the S-MN 104A does not have a direct interface with the T-MN 104B, the S-MN 104A, the CN 110, and the T-MN 104B may collectively perform a similar CN procedure as described above with respect to scenario 300A.

In turn, upon receiving the handover command message (i.e., either from the CN 110 or T-MN 104B), the S-MN 104A transmits 924A the handover command message to the UE 102, similar to events 324A and 624A, causing the UE 102 to release 926A the stored C-MN configuration and C-SN configuration, similar to events 326A and 626A.

The UE 102 then performs the immediate handover with the T-MN 104B, by performing 928A a random access procedure with the T-MN 104B via a T-PCell 124B, transmitting 930A a handover complete message during or after the random access procedure, and communicating 932A control signals and data with the MN 104B via the PCell 124B if the UE 102 successfully completes the random access procedure, similar to events 328A, 330A, and 332A, respectively. In some scenarios, the S-MN 104A can send 934A a Handover Cancel message to the C-MN 108, causing the C-MN 108 to release the C-MN configuration, similar to event 334A. In some scenarios, the S-MN 104A and C-SN 106B collectively perform 980A the conditional SN release procedure, similar to event 680A, causing the C-SN 106B to release the C-SN configuration.

In FIG. 9B, in a scenario 900B, the UE 102, S-MN 104A, and C-MN 108 collectively perform 960B the conditional handover configuration procedure, similar to event 960A. The UE 102, S-MN 104A, C-SN 106B, and SN 106A collectively perform 970B the CSAC configuration procedure, similar to event 970A.

Later on, and before the UE 102 determines that the condition for handing over to C-MN 108 and/or the condition for the conditional SN change is satisfied, the S-MN 104A determines 916B to perform an immediate handover procedure with the T-MN 104B, and subsequently sends 918B a Handover Request message to the T-MN 104B via an interface (e.g., X2/Xn interface) to request an immediate handover for the UE 102, similar to events 916A and 918A, respectively. Whereas in FIG. 9A the T-MN 104B identifies the C-MN configuration and C-SN configuration indicated in the Handover Request message to determine 920A to release the C-MN configuration and C-SN configuration stored at the UE 102, in FIG. 9B the T-MN 104B ignores (or discards) 920B the C-MN configuration and C-SN configuration indicated in the Handover Request message. Consequently, whereas in FIG. 9A the T-MN 104B generates a handover command message including a C-MN configuration to release field/IE and C-SN configuration to release field/IE, in FIG. 9B the T-MN 104B generates a handover command message excluding a C-MN configuration to release field/IE and a C-SN configuration to release field/IE. The T-MN 104B then sends 922B a Handover Request Acknowledge message including the handover command message to the S-MN 104A in response to receiving 918B the Handover Request message, similar to events 322B and 622B.

In implementations in which the S-MN 104A does not have a direct interface with the T-MN 104B, the S-MN 104A, the CN 110, and the T-MN 104B may collectively perform a similar CN procedure as described above with respect to scenario 300A.

In turn, upon receiving the handover command message (i.e., either from the CN 110 or T-MN 104B), the S-MN 104A transmits 924B the handover command message to the UE 102, similar to events 324B and 624B, causing the UE 102 to release 926B the stored C-MN configuration and C-SN configuration, similar to events 326B and 626B.

The UE 102 then performs the immediate handover with the T-MN 104B, by performing 928B a random access procedure with the T-MN 104B via a T-PCell 124B, transmitting 930B a handover complete message during or after the random access procedure, and communicating 932B control signals and data with the MN 104B via the PCell 124B if the UE 102 successfully completes the random access procedure, similar to events 928A, 930A, and 932A, respectively. In some scenarios, the S-MN 104A can send 934B a Handover Cancel message to the C-MN 108, causing the C-MN 108 to release the C-MN configuration, similar to event 934A. In some scenarios, the S-MN 104A and C-SN 106B collectively perform 980B the conditional SN release procedure, similar to event 980A, causing the C-SN 106B to release the C-SN configuration.

In some implementations alternative to events 918A, 918B, 920A, 920B, 922A, 922B, 924A, and 924B, the S-MN 104A can generate an RRC message (e.g., RRC reconfiguration message) including the S-MN configuration and excluding the C-MN configuration and the C-SN configuration, and then send, to the T-MN 104B, a Handover Request message including the RRC message, similar to events 417, 418, 717, and 718. Consequently, the T-MN 104B generates a handover command message excluding a C-MN configuration to release field/IE and a C-SN configuration to release field/IE and sends a Handover Request Acknowledge message including the handover command message to the S-MN 104A in response to receiving the Handover Request message, similar to events 422, 424, 722, and 724.

Referring to FIGS. 10 and 11, scenarios are shown in which the RAN initially provides a conditional configuration for CPAC to the UE 102, and later determines to release the conditional configuration stored at the UE 102 during an immediate SN addition/change procedure.

In FIG. 10, in a scenario 1000, the base station 104A operates as an MN for the UE 102, the base station 106A operates as an S-SN for the UE 102, and the base station 104B operates as a T-SN for the UE 102.

Initially, the UE 102 in DC communicates 1002 data with the MN 104A via the PCell 124A by using an MN configuration and with S-SN 106A via a PSCell (e.g., other than PSCell 126A) by using an SN configuration.

At a later time, upon determining 1004 to configure the UE 102 with a C-SN configuration for a CPAC procedure, the S-SN 106A provides the C-SN configuration to the UE 102. The C-SN configuration includes information that would enable the UE 102 to communicate with the S-SN 106A via a C-PSCell (e.g., C-PSCell 126A). The S-SN 106A includes the C-SN configuration in an RRC reconfiguration message for the UE 102, and subsequently transmits the RRC reconfiguration message to the UE 102. In some implementations, the S-SN 106A may include the RRC reconfiguration message in an SN Addition Request Acknowledge message, an SN Modification Request Acknowledge, an SN Modification Required message, or an SN Change Required message. The SN Addition Request Acknowledge message, SN Modification Request Acknowledge, SN Modification Required, or an SN Change Required message can conform to 3GPP TS 36.423 or TS 38.423.

To provide the C-SN configuration to the UE 102, in some implementations, the S-SN 106A transmits 1012A the RRC reconfiguration message including the C-SN configuration to the MN 104A, which in turn transmits 1013A the RRC reconfiguration message to the UE 102. The MN 104A may transmit 1013 the RRC reconfiguration message in a first RRC container message and transmit the first RRC container message to the UE 102. In response to receiving the RRC reconfiguration message, the UE 102 optionally transmits 1014A the RRC reconfiguration complete message to the MN 104A. The UE 102 may include the RRC reconfiguration complete message in a first RRC container response message and transmit the first RRC container response message to the MN 104A. Upon receiving 1014A the RRC reconfiguration complete message, the MN 104A optionally transmits 1015A the SN Reconfiguration Complete message to the S-SN 106A. The events 1012A, 1013A, 1014A, 1015A are collectively referred to in FIG. 10 as the CPAC procedure 1060A.

Alternative to performing the CPAC procedure 1060A, in other implementations, the S-SN 106A utilizes SRB3 to transmit 1012B the RRC reconfiguration message including the C-SN configuration directly to the UE 102, which in turn optionally transmits 1014B the RRC reconfiguration complete message to the S-SN 106A in response to receiving the RRC reconfiguration message. The events 1012B, 1014B are collectively referred to in FIG. 10 as the CPAC procedure 1060B.

In some implementations, the S-SN 106A includes, in the C-SN configuration or in the RRC reconfiguration message, a condition (or conditions) for the UE 102 to detect, so that the UE 102 can communicate with the S-SN 106A via the C-PSCell 126A if the condition is satisfied. The S-SN 106A can include the C-SN configuration in a conditional configuration field or IE of the RRC reconfiguration message. The S-SN 106A can further include a configuration ID associated to the C-SN configuration in the conditional configuration field/IE, so that the UE 102 can identify and store the C-SN configuration. The S-SN 104A may allocate the configuration ID.

Later on, and before the UE 102 determines that the condition for the CPAC is satisfied, either the S-SN 106A or MN 104A initiates an immediate SN addition or change procedure with the T-SN 104B, e.g., blindly or in response to detecting a suitable event, for the T-SN 104B and the UE 102 to communicate. For example, the S-SN 106A may determine to perform an immediate SN addition or change procedure in response to one or more measurement results received from the UE 102 or obtained by the S-SN 106A from measurements on signals received from the UE 102. As another example, the MN 104A may determine to perform an immediate SN addition or change procedure in response to one or more measurement results received from the UE 102 or obtained by the MN 104A from measurements on signals received from the UE 102.

If the S-SN 106A initiates the immediate SN addition or change procedure (i.e., SN-initiated SN addition or change procedure), the S-SN 106A can send 1015 an SN Change Required message including the C-SN configuration to the MN 104A, which in turn determines 1016 to perform the immediate SN addition or change procedure. In some implementations, the S-SN 106A can include the C-SN configuration in a CG-Config IE (or RRC inter-node message) and include the CG-Config IE in the SN Change Required message. The SN Change Required message may further include a configuration ID associated to the C-SN configuration if the configuration ID is allocated by the S-SN 106A. In some implementations, the configuration ID may be included in the CG-Config IE. In one implementation, the S-SN 106A can generate an RRC message (e.g., RRC reconfiguration message) including the C-SN configuration and include the RRC message in the CG-Config IE. The CG-Config IE can conform to 3GPP TS 38.331.

Alternative to the SN-initiated SN addition or change procedure, the MN 104A may determine 1016 to perform the immediate SN addition or change procedure (i.e., MN-initiated SN addition or change procedure), e.g., in response to one or more measurement results received from the UE 102; or in response to receiving a CG-Config IE in an SN message (e.g., an SN Modification Required message or an SN Modification Request Acknowledgement message) from the S-SN 106A.

In response to receiving 1015 the SN Change Required message or determining 1016 to perform the immediate SN addition or change procedure, the MN 104A sends 1018 an SN Addition Request message to the T-SN 104B via an interface (e.g., X2/Xn interface). The SN Addition Request message includes the SN configuration, so that the T-MN 104B is aware of any pre-existing configurations (e.g., SN configuration) known by the UE 102 to determine additional configuration(s) still needed by the UE 102 when performing an immediate SN addition or change. In addition, because T-SN 104B is unaware of the C-SN configuration stored at the UE 102, the S-MN 104A includes the C-SN configuration in the SN Addition Request message, so that upon receiving the SN Addition Request message, the T-SN 104B is aware of the C-SN configuration stored at the UE 102. In some implementations, the MN 104A can include the configuration ID associated to the C-SN configuration in the SN Addition Request message. In some implementations, the MN 104A can include the C-SN configuration in a CG-ConfigInfo IE (or RRC inter-node message) and include the CG-ConfigInfo IE in the SN Addition Request message. In other implementations, the configuration ID may be included in the CG-ConfigInfo IE. In some implementations, the MN 104A may include the RRC message received in the CG-Config IE in the SN Change Required message or in the SN message. That is, the MN 104A receives the SN message before sending the SN Addition Request message 1018. The CG-ConfigInfo IE can conform to 3GPP TS 38.331.

Upon identifying the C-SN configuration indicated in the SN Addition Request message, the T-SN 104B determines 1020 to release the C-SN configuration stored at the UE 102. In response to the determination, the T-SN 104B generates an RRC reconfiguration message including a C-SN configuration to release field/IE. The RRC reconfiguration message also includes one or more random access configurations needed by the UE 102 to perform an immediate SN addition or change procedure with the T-SN 104B. The T-SN 104B then sends 1022 an SN Addition Request Acknowledge message including the RRC reconfiguration message to the MN 104A in response to receiving 1018 the SN Addition Request message. In some implementations, the T-SN 104B can include the RRC reconfiguration message in a CG-Config IE and include the CG-Config IE in the SN Addition Request Acknowledge message. The T-SN 104B can include the configuration ID associated to the C-SN configuration in the C-SN configuration to release field/IE.

In turn, the MN 104A transmits 1024 the RRC reconfiguration message to the UE 102, causing the UE 102 to release 1026 the stored C-SN configuration. The MN 104A may transmit 1024 the RRC reconfiguration message in a second RRC container message and transmit the second RRC container message to the UE 102. In one implementation, the UE 102 can identify the configuration ID included in the C-SN configuration to release field/IE to release the C-SN configuration associated with the configuration ID. The MN 104 may optionally send 1023 an SN Change Confirm message to the S-SN 106A in response to receiving 1015 the SN Change Required message, before or after transmitting 1024 the RRC reconfiguration message to the UE 102. In some implementations, the UE 102 may also release the condition associated to the C-SN configuration if the UE 102 identifies the configuration ID included in the C-SN configuration to release field/IE. In other implementations, the UE 102 releases the conditional configuration field/IE including the C-SN configuration and the condition if the UE 102 identifies the configuration ID included in the C-SN configuration to release field/IE. In some implementations, the condition may be associated to at least one measurement configuration (e.g., MeasConfig IE) which the S-SN 106A configured to the UE 102 before transmitting the RRC reconfiguration message to the UE 102. The at least one measurement configuration is associated to a measurement identity (e.g., MeasId IE). In some implementations, the UE 102 may release the at least one measurement configuration if the UE 102 identifies the configuration ID included in the C-SN configuration to release field/IE. In other implementations, the UE 102 does not release the at least one measurement configuration if the UE 102 identifies the configuration ID included in the C-SN configuration to release field/IE. Instead, the UE 102 releases a measurement configuration in the at least one measurement configuration if the UE 102 identifies a measurement identity (associated to the measurement configuration) in a measurement identity to remove list field/IE (e.g., measIdToRemoveList) in the RRC reconfiguration message. The T-SN 104B may determine to release the measurement configuration in response to determining 1020 to release the C-SN configuration so that the T-SN 104B includes the measurement identity to remove list field/IE in the RRC reconfiguration message.

The UE 102, in response to releasing 1026 the C-SN configuration, can transmit 1027 an RRC reconfiguration complete message to the MN 104A. The UE 102 may include the RRC reconfiguration complete message in a second RRC container response message and transmit the second RRC container response message to the MN 104A. Upon receiving 1027 the RRC reconfiguration complete message, the MN 104A transmits 1029 an SN Reconfiguration Complete message to the T-SN 104B.

The UE 102 also performs the immediate SN addition or change procedure with the T-MN 104B in response to the handover command message. In performing the SN addition or change procedure, the UE 102 performs 1028 a random access procedure with the T-SN 104B via a T-PSCell 124B, e.g., by using one or more random access configurations in the RRC reconfiguration message. If the UE 102 successfully completes the random access procedure, the UE 102 communicates 1032 in DC with the MN 104A and the SN 104B via PSCell 126A. To perform the random access procedure, the UE 102 may disconnect from the PSCell (e.g., other than PSCell 126A) or the S-SN 106A.

In some implementations, the RRC reconfiguration message may include a RRCReconfiguration-IEs or a CellGroupConfig IE that configures the PSCell 124B and may configure zero, one, or more SCells of the T-SN 104B. The RRC reconfiguration message may include a radio bearer configuration (RadioBearerConfig IE). In other implementations, the RRC reconfiguration message 1024 can include an SCG-ConfigPartSCG-r12 IE that configures the PSCell 124B and may configure zero, one, or more SCells of the T-SN 104B.

In some implementations, if the MN 104A is an eNB or a next generation eNB (ng-eNB), the RRC reconfiguration message, the RRC reconfiguration complete message, the RRC container message (i.e., the first RRC container message, the second RRC container message), and the RRC container response message (i.e., the first RRC container response message, the second RRC container response message) can be an RRCConnectionReconfiguration message, RRCConnectionReconfigurationComplete message, RRCConnectionReconfiguration message, and RRCConnectionReconfigurationComplete, respectively. If the MN 104A is a gNB, the RRC reconfiguration message, RRC reconfiguration complete message, the RRC container message (i.e., the first RRC container message, the second RRC container message), and the RRC container response message (i.e., the first RRC container response message, the second RRC container response message) can be an RRCReconfiguration message, RRCReconfigurationComplete message, RRCReconfiguration message, and RRCReconfigurationComplete, respectively.

In some implementations, the T-SN 104B may consist of CU 172 and one or more DU 174 as shown in FIG. 1C. The DU 174 may include some configurations (e.g., one or more random access configurations, a physical downlink control channel (PDCCH) configuration, physical uplink control channel (PUCCH) configuration, etc.) in the RRC reconfiguration message and send the configurations to the CU 172. The UE 102 can perform the random access procedure with the DU 172 by using the one or more random access configurations. The CU 172 may include other configurations (e.g., SRB configuration, an DRB configuration, a security configuration and/or a measurement configuration) in the RRC reconfiguration message. In other implementations, the DU 174 may generate the CellGroupConfig IE in the RRC reconfiguration message and the CU 172 may generate the RadioBearerConfig IE.

In FIG. 11, in a scenario 1100, the UE 102 in DC communicates 1102 data with the MN 104A via the PCell 124A by using an MN configuration and with S-SN 106A via a PSCell (e.g., other than PSCell 126A) by using an SN configuration, similar to event 1012.

At a later time, upon determining 1104 to configure the UE 102 with a C-SN configuration for a CPAC procedure, the S-SN 106A provides the C-SN configuration to the UE 102, by performing 1160 the CPAC procedure, similar to event 1060A or alternatively, 1060B.

Later on, and before the UE 102 determines that the condition for the CPAC is satisfied, whereas in FIG. 10 the MN 104A determines 1016 to perform the immediate SN addition or change procedure (i.e., MN-initiated SN addition or change procedure) in response to receiving a CG-Config IE in an SN message from the S-SN 106A, in FIG. 11 the S-SN 106A determines 1116 to perform the immediate SN addition or change procedure.

The S-SN 106A then generates 1117 an RRC message (e.g., RRC reconfiguration message) including the SN configuration and excluding the C-SN configuration, and then sends 1115, to the MN 104A, an SN Change Required message including the RRC message. In one implementation, the RRC message is included in a CG-Config IE and the SN Change Required message includes the CG-Config IE.

In response to receiving 1115 the SN Change Required message, the MN 104A sends 1118 an SN Addition Request message including the RRC message to the T-SN 104B via an interface (e.g., X2/Xn interface), similar to event 1018.

Upon receiving the SN Addition Request message, the T-SN 104B sends 1122 an SN Addition Request Acknowledge message including the RRC reconfiguration message to the MN 104A, similar to event 1022, in response to receiving 1118 the SN Addition Request message. The MN 104 may optionally send 1123 an SN change confirm message to the S-SN 106A, similar to event 1023.

In turn, the MN 104A transmits 1124 the RRC reconfiguration message to the UE 102, similar to event 1024, causing the UE 102 to release 1126 the stored C-SN configuration. In one implementation, the UE 102 is configured to release the stored C-SN configuration upon recognizing that the RRC reconfiguration message does not include a C-SN configuration to release field/IE. The MN 104 may optionally send 1123 an SN Change Confirm message to the S-SN 106A, similar to event 1023, in response to receiving 1115 the SN Change Required message, before or after transmitting 1124 the RRC reconfiguration message to the UE 102. In some implementations, the UE 102 may also release the condition associated to the C-SN configuration upon recognizing that the RRC reconfiguration message does not include a C-SN configuration to release field/IE. In other implementations, the UE 102 releases the conditional configuration field/IE including the C-SN configuration and the condition upon recognizing that the RRC reconfiguration message does not include a C-SN configuration to release field/IE. In some implementations, the condition may be associated to at least one measurement configuration (e.g., MeasConfig IE) which the S-SN 106A configured to the UE 102 before transmitting the RRC reconfiguration message to the UE 102. The at least one measurement configuration is associated to a measurement identity (e.g., MeasId IE). In some implementations, the UE 102 may release the at least one measurement configuration upon recognizing that the RRC reconfiguration message does not include a C-SN configuration to release field/IE. In other implementations, the UE 102 does not release the at least one measurement configuration upon recognizing that the RRC reconfiguration message does not include a C-SN configuration to release field/IE. Instead, the UE 102 releases a measurement configuration in the at least one measurement configuration if the UE 102 identifies a measurement identity (associated to the measurement configuration) in a measurement identity to remove list field/IE (e.g., measIdToRemoveList) in the RRC reconfiguration message. The T-SN 104B may determine to release the measurement configuration in response to S-SN 106A determining 1116 to change from S-SN 106A to T-SN 106B, or in response to receiving the SN Addition Request message, and as a result, include the measurement identity to remove list field/IE in the RRC reconfiguration message.

The UE 102, in response to releasing 1126 the C-SN configuration, can transmit 1127 an RRC reconfiguration complete message to the MN 104A, similar to event 1027, which in turn transmits 1129 an SN reconfiguration complete message to the T-SN 104B, similar to event 1029.

The UE 102 also performs the immediate SN addition or change procedure with the T-MN 104B in response to the handover command message. In performing the SN addition or change procedure, the UE 102 performs 1128 a random access procedure with the T-SN 104B via a T-PSCell 124B, similar to event 1028. If the UE 102 successfully completes the random access procedure, the UE 102 communicates 1132 in DC with the MN 104A and the SN 104B, similar to 1032.

Figure 12:
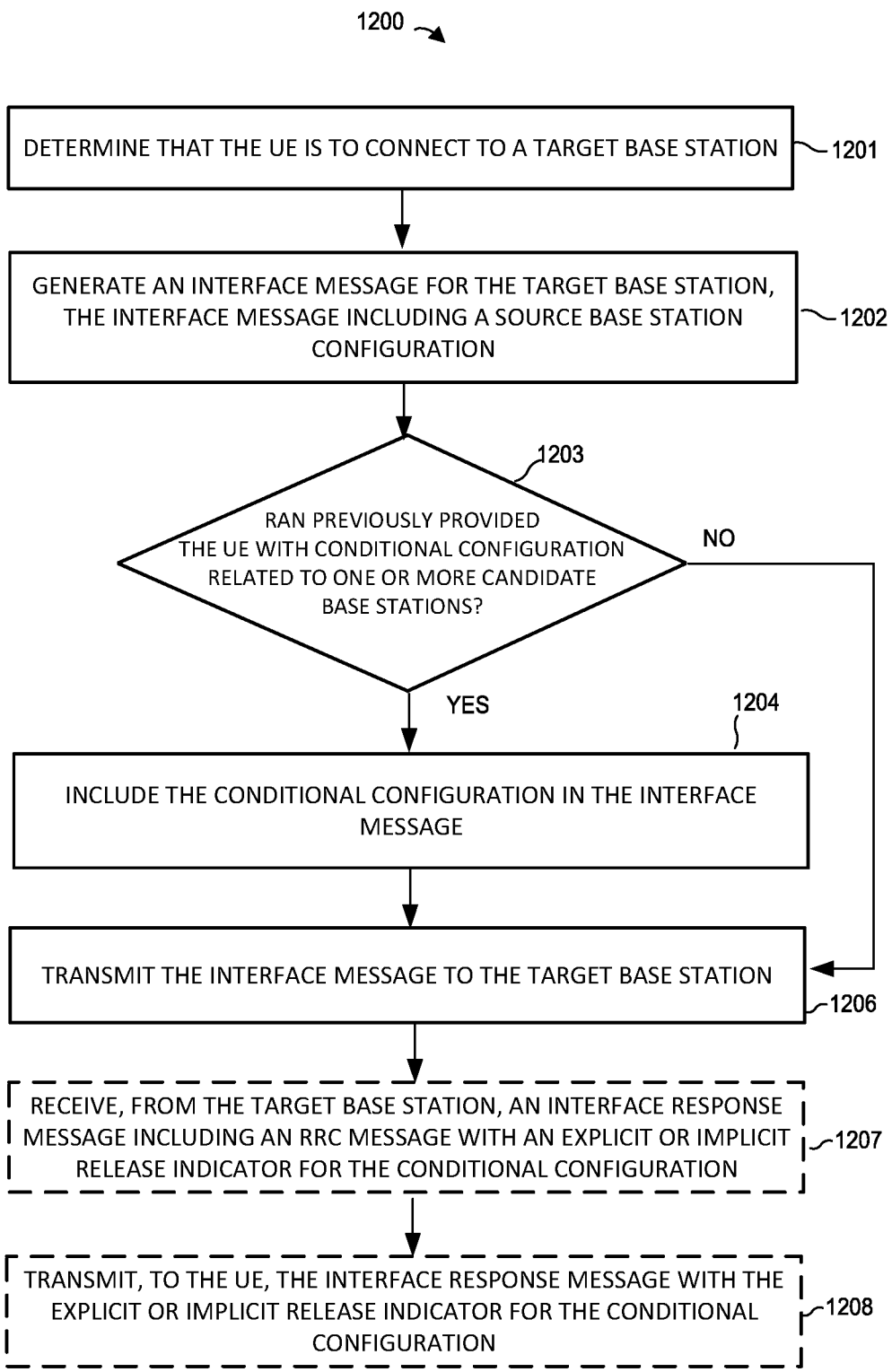
FIG. 12 is a flow diagram depicting an example method, implemented in a base station, for handling the release of a conditional configuration stored at a user device upon determining to configure the user device to connect to a target base station, by including the conditional configuration in an interface message.

FIG. 12 is a flow diagram depicting an example method 1200, implemented in a base station (e.g., MN 104A), for handling the release of a conditional configuration stored at a user device (e.g., UE 102) upon determining to configure the user device to connect to a target base station, by including the conditional configuration in an interface message.

At block 1201, the base station determines to configure the user device to connect to a target base station (e.g., in any one of events 316A, 316B, 616A, 616B, 916A, 916B, 1016). This configuration can correspond to an immediate procedure such as handover, SN addition or change, or PScell addition or change.

At blocks 1202-1206, the base station generates and transmits an interface message to the target base station to request configuration of the user device to connect to the target base station (e.g., in any one of events 318A, 318B, 618A, 618B, 918A, 918B, 1018). The base station generates an interface message at block 1202 and includes the source base station configuration in the interface message. If the base station determines, at block 1203, that the RAN previously provided conditional configuration to the UE, the flow proceeds to block 1204, where the base station also includes the conditional configuration in the interface message. Otherwise, the flow proceeds directly to block 1206, where the base station transmits the interface message to the target base station. When the interface message includes the conditional configuration, the target base station becomes aware of the conditional configuration stored at the user device, and can subsequently initiate the release of the conditional configuration at the user device.

In at least some of the cases, at block 1207, the base station receives an interface response message from the target base station. The interface response message can include an RRC message with an explicit or implicit release indicator for the conditional configuration, for connecting the UE to the target base station and releasing the conditional configuration at the UE (e.g., in any one of events 322A, 322B, 622A, 622B, 922A, 922B, 1022).

At block 1208, the base station transmits the interface response message with the explicit or implicit release indicator for the conditional configuration to the UE (e.g., in any one of events 324A, 324B, 624A, 624B, 924A, 924B, 1024), causing the UE to release the conditional configuration.

Figure 13:
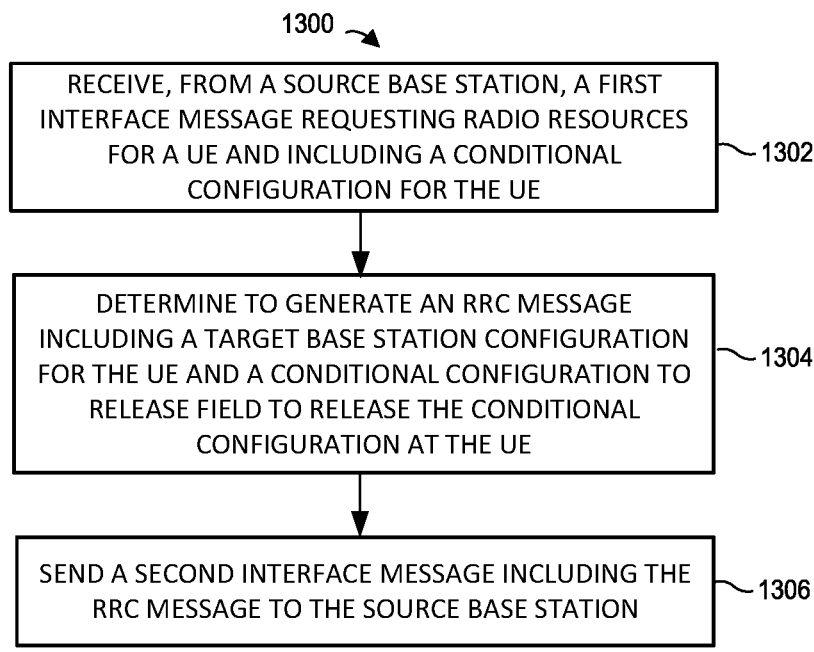
FIG. 13 is a flow diagram depicting an example method, implemented in a base station, for handling the release of a conditional configuration stored at a user device upon receiving a Handover Request message or an SN Addition Request message.

FIG. 13 is a flow diagram depicting an example method 1300, implemented in a base station (e.g., T-MN 104B, T-SN 104B), for handling the release of a conditional configuration stored at a user device (e.g., UE 102) upon receiving a Handover Request message or an SN Addition Request message.

In the method 1300, at block 1302, the base station receives, from a source base station, a first interface message which requests radio resources for a user device and includes a conditional configuration for the user device (e.g., in any one of events 318A, 618A, 918A, 1018).

At block 1304, the base station determines to generate an RRC message including a target base station configuration for the user device and a conditional configuration to release field to release the conditional configuration at the user device (e.g., in any one of events 320A, 620A, 920A, 1020).

At block 1306, the base station sends a second interface message including the RRC message to the source base station (e.g., in any one of events 322A, 622A, 922A, 1022).

Figure 14:
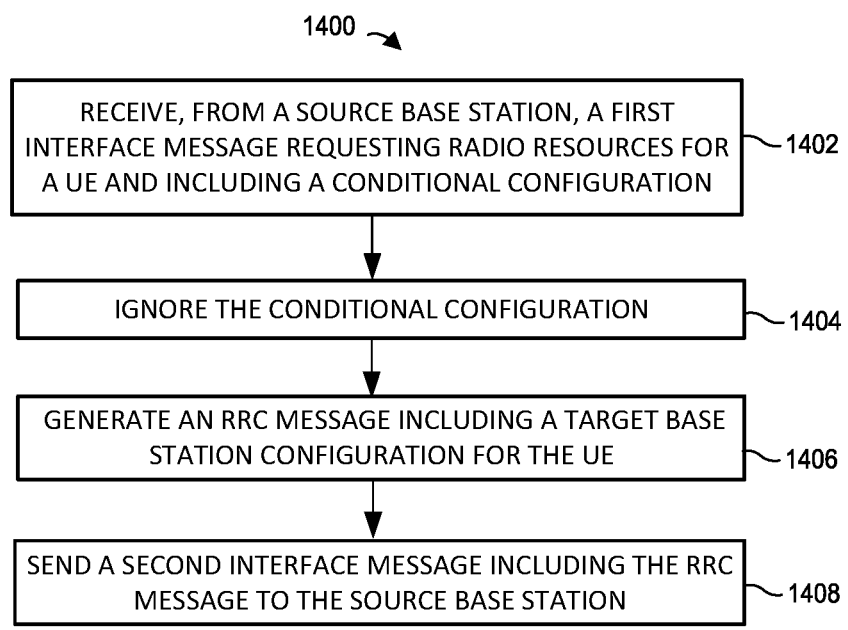
FIG. 14 is a flow diagram depicting an alternative example method, implemented in a base station, for handling the release of a conditional configuration stored at a user device upon receiving a Handover Request message or an SN Addition Request message.

FIG. 14 is a flow diagram depicting an example method 1400, implemented in a base station (e.g., T-MN 104B, T-SN 104B), for handling the release of a conditional configuration stored at a user device (e.g., UE 102) upon receiving a Handover Request message or an SN Addition Request message.

In the method 1400, at block 1402, the base station receives, from a source base station, a first interface message which requests radio resources for a user device and includes a conditional configuration for the user device (e.g., in any one of events 318B, 618B, 918B).

At block 1404, the base station ignores the conditional configuration (e.g., in any one of events 320B, 620B, 920B).

At block 1406, the base station determines to generate an RRC message including a target base station configuration for the user device (e.g., in any one of events 320B, 620B, 920B).

At block 1408, the base station sends a second interface message including the RRC message to the source base station (e.g., in any one of events 322B, 622B, 922B).

Figure 15:
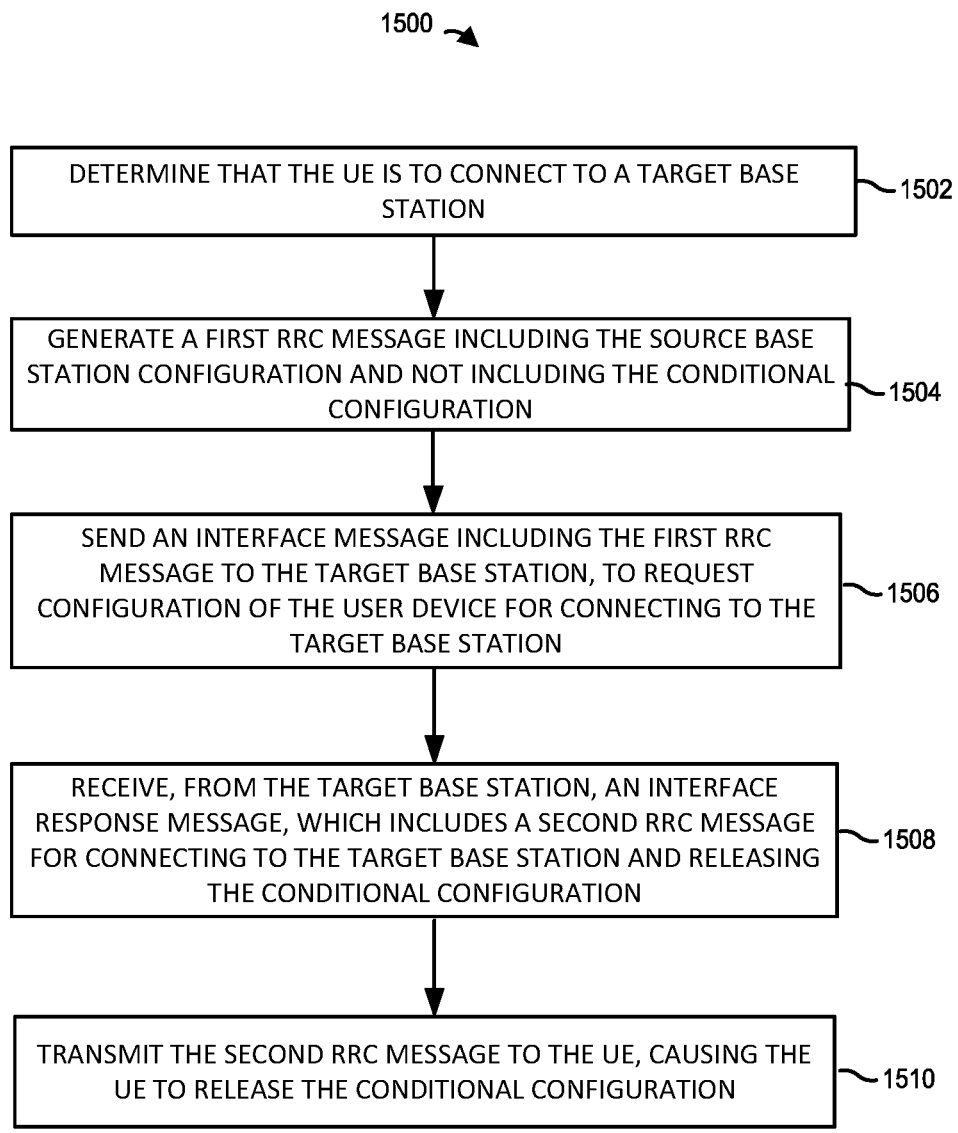
FIG. 15 is a flow diagram depicting an example method, implemented in a base station, for handling the release of a conditional configuration stored at a user device upon determining to configure the user device to connect to a target base station, by excluding the conditional configuration in an interface message.

FIG. 15 is a flow diagram depicting an example method 1500, implemented in a base station (e.g., MN 104A, SN 106A), for handling the release of a conditional configuration stored at a user device (e.g., UE 102) upon determining to configure the user device to connect to a target base station, by excluding the conditional configuration in an interface message.

In the method 1500, at block 1502, the base station determines to configure the user device to connect to a target base station (e.g., in any one of events 416, 716, 1116).

At block 1504, the base station generates a first RRC message including the source base station configuration and excluding the conditional configuration (e.g., in any one of events 417, 717, 1117).

At block 1506, the base station sends an interface message including the first RRC message to the target base station to request configuring the user device to connect to the target base station (e.g., in any one of events 418, 718, 1118).

At block 1508, the base station receives an interface response message from the target base station which includes a second RRC message for connecting the UE to the target base station and releasing the conditional configuration at the UE (e.g., in any one of events 422, 722, 1122).

At block 1510, the base station transmits the second RRC message to the UE (e.g., in any one of events 424, 724, 1124), causing the UE to release the conditional configuration.

Figure 16:
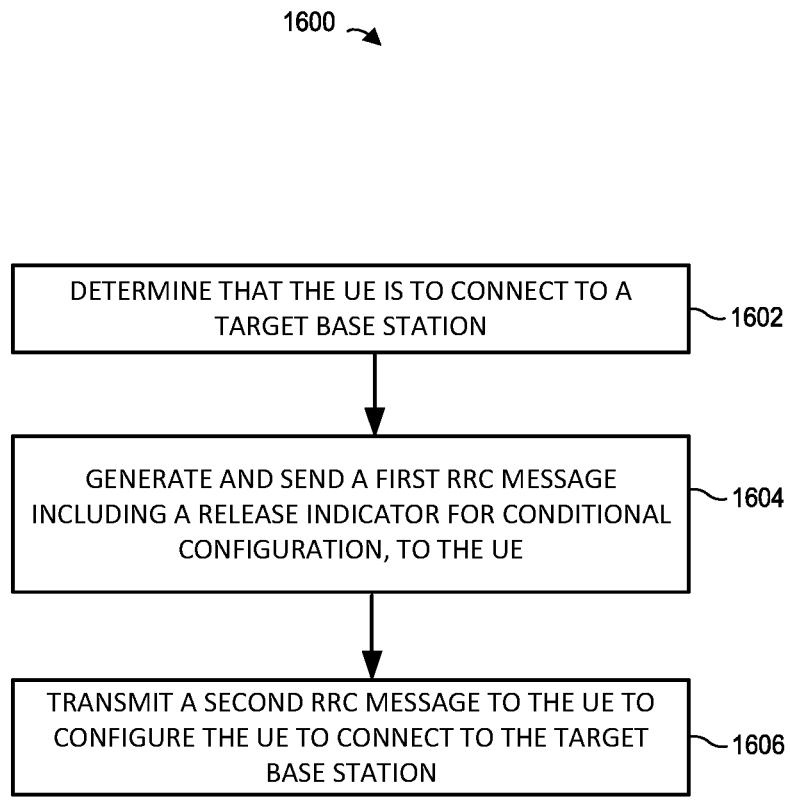
FIG. 16 is a flow diagram depicting an example method, implemented in a base station, for handling the release of a conditional configuration stored at a user device upon determining to configure the user device to connect to a target base station, by including an identification of the conditional configuration in an interface message.

FIG. 16 is a flow diagram depicting an example method 1600, implemented in a base station (e.g., MN 104A), for handling the release of a conditional configuration stored at a user device (e.g., UE 102) upon determining to configure the user device to connect to a target base station, by including an identification of the conditional configuration in an interface message.

In the method 1600, at block 1602, the base station determines to configure the user device to connect to a target base station (e.g., in any one of events 516, 816).

At block 1604, the base station generates and sends a first RRC message including a conditional configuration to release field to the user device (e.g., in any one of events 517, 817), causing the user device to release the conditional configuration.

At block 1606, the base station transmits a second RRC message to the user device to configure the user device to connect to the target base station (e.g., in any one of events 524, 824).

Figure 17:
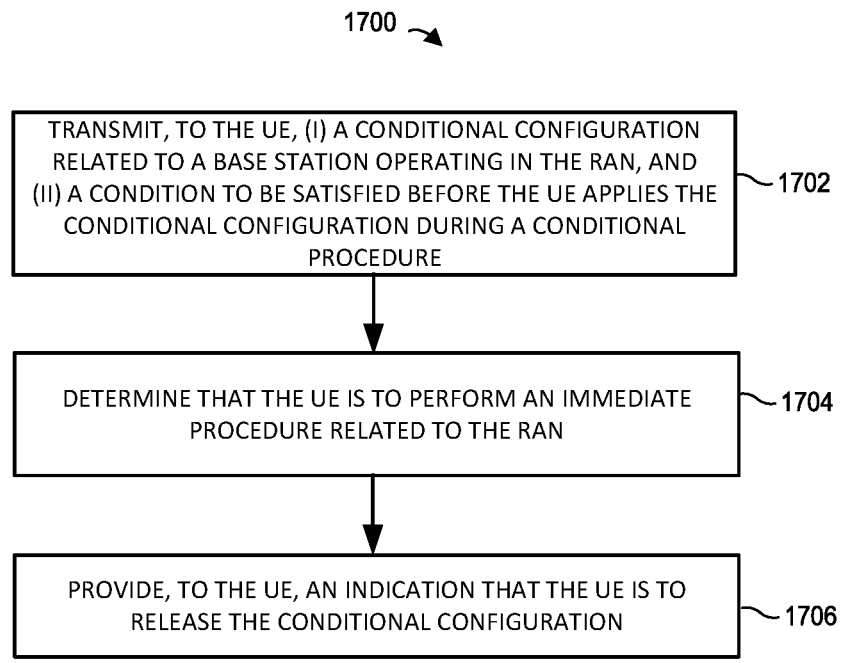
FIG. 17 is a flow diagram depicting an example method, implemented in a RAN, for handling the release of a conditional configuration stored at a user device.

FIG. 17 is a flow diagram depicting an example method 1700, implemented in a RAN (e.g., the base stations 104A and 104B), for handling the release of a conditional configuration stored at a user device (e.g., UE 102).

In the method 1700, at block 1702, the RAN transmits, to a user device, (i) a conditional configuration related to a base station operating in the RAN, and (ii) a condition to be satisfied before the UE applies the conditional configuration during a conditional procedure (e.g., in any one of events 360A, 360B, 460, 560, 670A, 670B, 760, 860, 960A, 960B, 970A, 970B, 1060A, 1060B, 1160).

At block 1704, the RAN subsequently determines that the UE is to perform an immediate procedure related to the RAN (e.g., in any one of events 316A, 316B, 416, 516, 616A, 616B, 716, 816, 916A, 916B, 1016, 1116).

At block 1706, the RAN provides, to the user device, an indication that the UE is to release the conditional configuration (e.g., in any one of events 324A, 324B, 424, 524, 624A, 624B, 724, 824, 924A, 924B, 1024, 1124).

Figure 18:
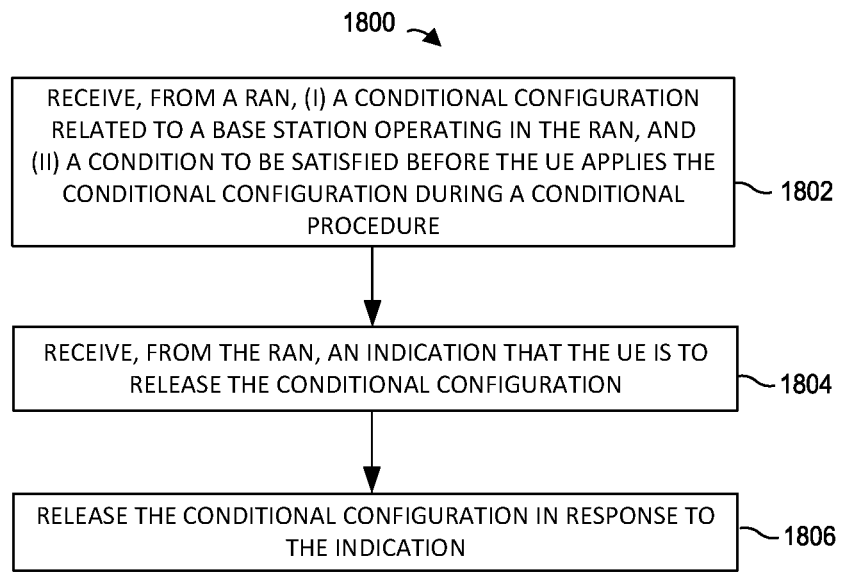
FIG. 18 is a flow diagram depicting an example method, implemented in a user device, for handling the release of a conditional configuration stored at the user device.

FIG. 18 is a flow diagram depicting an example method 1800, implemented in a user device (e.g., the UE 102), for handling the release of a conditional configuration stored at the user device.

In the method 1800, at block 1802, the user device receives, from a base station, (i) a conditional configuration related to a base station operating in the RAN, and (ii) a condition to be satisfied before the UE applies the conditional configuration during a conditional procedure (e.g., in any one of events 360A, 360B, 460, 560, 670A, 670B, 760, 860, 960A, 960B, 970A, 970B, 1013A, 1012B, 1160).

At block 1804, the user device receives, from the base station, an implicit or explicit indication that the UE is to release the conditional configuration (e.g., in any one of events 324A, 324B, 424, 517, 624A, 624B, 724, 817, 924A, 924B, 1024, 1124).

At block 1806, the user device releases the conditional configuration in response to the indication (e.g., in any one of events 326A, 326B, 426, 526, 626A, 626B, 726, 826, 926A, 926B, 1026, 1126).

The following description may be applied to the description above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Aspect 1. A method in a radio access network (RAN) for configuring a user equipment (UE), the method comprising: transmitting, by the processing hardware and to the UE, (i) a conditional configuration related to a base station operating in the RAN, and (ii) a condition to be satisfied before the UE applies the conditional configuration during a conditional procedure; determining, by the processing hardware and subsequently to the transmitting, that the UE is to perform an immediate procedure related to the RAN; and providing, by the processing hardware and to the UE, an indication that the UE is to release the conditional configuration.

Aspect 2. The method of aspect 1, wherein providing the indication includes transmitting, to the UE, a message that includes a release indicator instructing the UE to release the conditional configuration.

Aspect 3. The method of aspect 2, wherein transmitting the message includes: transmitting a handover command from a source base station different from the base station to which the conditional configuration is related.

Aspect 4. The method of aspect 3, wherein the determining that the UE is to perform the immediate procedure related to the RAN includes determining that the UE is to perform the immediate procedure at the source base station, the method further including: transmitting, from the source base station to a target base station, a handover request message including the conditional configuration; and receiving, at the source base station from the target base station, a handover request acknowledgement message including the handover command.

Aspect 5. The method of aspect 3, including: receiving, at a target base station from the source base station, a handover request including (i) the conditional configuration and (ii) a configuration related to the source base station; determining, at the target base station, that the conditional configuration is to be discarded; generating, at the target base station, the handover command including the release indicator; and transmitting, from the target base station to the source base station, a handover request acknowledgement message including the handover command.

Aspect 6. The method of aspect 2, wherein transmitting the message includes: transmitting a Radio Resource Control (RRC) message from the RAN to the UE.

Aspect 7. The method of aspect 6, further comprising: transmitting, from a source base station to a target base station, a secondary node (SN) addition request that includes the conditional configuration; and receiving, at the source base station from the target base station, an acknowledgement message including the release indicator; wherein transmitting the RRC message is in response to receiving the acknowledgement message.

Aspect 8. The method of aspect 1, wherein providing the indication includes: transmitting, to the UE, an instruction to initiate the immediate procedure, wherein the UE releases the conditional configuration in response to the instruction.

Aspect 9. The method of aspect 8, wherein the instruction is one of (i) a handover command or (ii) an RRC message including information related to a new SN or a new primary secondary cell (PScell).

Aspect 10. The method of aspect 1, wherein providing the indication includes providing the indication from a master node (MN); the method further comprising: receiving, from the MN at a target base station different from the base station to which the conditional configuration is related, the conditional configuration; and transmitting a message from the target base station to the MN, the message including a release indicator indicating that that the UE is to release the conditional configuration.

Aspect 11. The method of aspect 10, wherein generating the message includes generating a handover command.

Aspect 12. The method of aspect 10, wherein generating the message includes generating an RRC reconfiguration message.

Aspect 13. The method of aspect 1, further comprising: transmitting, from a base station that provides the indication to the base station to which the conditional configuration relates, an instruction to release the conditional configuration.

Aspect 14. The method of any of the preceding aspects, wherein: the base station to which the conditional configuration is related is a first base station; and the immediate procedure relates to a second base station different from the first base station.

Aspect 15. The method of any of the preceding aspects, wherein the conditional procedure is one of: (i) a conditional handover, (ii) a conditional SN change or addition, or (iii) a conditional PScell change or addition.

Aspect 16. A RAN comprising processing hardware and configured to perform the method of any of the preceding aspects.

Aspect 17. A method in a user equipment (UE) for processing configuration, the method comprising: receiving, by the processing hardware and from a radio access network (RAN), (i) a conditional configuration related to a base station operating in the RAN, and (ii) a condition to be satisfied before the UE applies the conditional configuration during a conditional procedure; subsequently to receiving the conditional configuration, receiving, by the processing hardware and from the RAN, an indication that the UE is to release the conditional configuration; and releasing, by the processing hardware, the conditional configuration in response to the indication.

Aspect 18. The method of aspect 17, wherein receiving the indication includes receiving, from the RAN, a message that includes a release indicator instructing the UE to release the conditional configuration.

Aspect 19. The method of aspect 18, wherein receiving the message includes: receiving a handover command from a source base station different from the base station to which the conditional configuration is related.

Aspect 20. The method of aspect 18, wherein receiving the message includes: receiving a Radio Resource Control (RRC) message from the RAN.

Aspect 21. The method of aspect 17, wherein receiving the indication includes: receiving, from the RAN, an instruction to initiate an immediate procedure.

Aspect 22. The method of aspect 21, wherein the instruction is one of (i) a handover command or (ii) an RRC message including information related to a new SN or a new primary secondary cell (PScell).

Aspect 23. The method of aspect 21, wherein the conditional procedure is one of: (i) a conditional handover, (ii) a conditional SN change or addition, or (iii) a conditional PScell change or addition.

Aspect 24. A UE comprising processing hardware and configured to perform the method of any of aspects 17 to 23.

What is claimed is:

1. A method performed in a radio access network (RAN) for configuring a user equipment (UE), the method comprising:
    transmitting, by a source base station operating in the RAN and to the UE, (i) a conditional configuration related to a base station different from the source base station and operating in the RAN, and (ii) a condition to be satisfied before the UE applies the conditional configuration during one of: a conditional secondary node (SN) change, a conditional SN addition, a conditional primary secondary cell (PScell) change, or a conditional PScell addition;
    determining, by the source base station and subsequently to transmitting, that the UE is to unconditionally perform an immediate procedure related to the RAN; and
    providing, by the source base station and to the UE, an indication that the UE is to unconditionally perform the immediate procedure and release the conditional configuration.

2. The method of claim 1, wherein providing the indication includes transmitting, to the UE, an instruction to initiate the immediate procedure; and
    the instruction includes an implicit release indicator instructing the UE to release the conditional configuration.

3. The method of claim 2, wherein transmitting the instruction includes
    transmitting a handover command from the source base station.

4. The method of claim 3, further comprising:
    transmitting, from the source base station to a target base station, a handover request message including the conditional configuration; and
    receiving, at the source base station from the target base station, a handover request acknowledgement message including the handover command.

5. The method of claim 2, wherein transmitting the instruction includes transmitting a Radio Resource Control (RRC) message from the source base station to the UE, the method further comprising:
    transmitting, from the source base station to a target base station, a secondary node (SN) addition request that includes the conditional configuration; and
    receiving, at the source base station from the target base station, an acknowledgement message including the release indicator;
    wherein transmitting the RRC message is in response to receiving the acknowledgement message.

6. The method of claim 1, wherein providing the indication includes:
    transmitting, to the UE, a message that includes an explicit release indicator instructing the UE to release the conditional configuration.

7. The method of claim 1, wherein providing the indication includes providing the indication from a master node (MN), and the method further comprises:
    receiving, from the MN at a target base station different from the base station to which the conditional configuration is related, the conditional configuration; and transmitting a message from the target base station to the MN, the message including a release indicator indicating that the UE is to release the conditional configuration.

8. The method of claim 1, wherein:
the base station to which the conditional configuration is related is a first base station; and
the immediate procedure relates to a second base station different from the first base station.

9. A RAN comprising processing hardware of a source base station configured to:
transmit, to a UE, (i) a conditional configuration related to a base station different from the source base station and operating in the RAN, and (ii) a condition to be satisfied before the UE applies the conditional configuration during one of: a conditional secondary node (SN) change, a conditional SN addition, a conditional primary secondary cell (PScell) change, or a conditional PScell addition;
determine, subsequently to the transmitting, that the UE is to unconditionally perform an immediate procedure related to the RAN; and
provide, to the UE, an indication that the UE is to unconditionally perform the immediate procedure and release the conditional configuration.

10. The RAN of claim 9, wherein:
the processing hardware is configured to provide the indication by transmitting, to the UE, an instruction to initiate the immediate procedure; and
the instruction includes an implicit release indicator instructing the UE to release the conditional configuration.

11. The RAN of claim 10, wherein the processing hardware is configured to transmit the instruction by transmitting a handover command from the source base station.

12. The RAN of claim 11, wherein the processing hardware is further configured to:
transmit, from the source base station to a target base station, a handover request message including the conditional configuration; and
receive, at the source base station from the target base station, a handover request acknowledgement message including the handover command.

13. The RAN of claim 10, wherein:
the processing hardware is configured to transmit the instruction by transmitting a Radio Resource Control (RRC) message from the source base station to the UE, and
the processing hardware is further configured to:
transmit, from the source base station to a target base station, a secondary node (SN) addition request that includes the conditional configuration; and
receive, at the source base station from the target base station, an acknowledgement message including the release indicator;
wherein transmitting the RRC message is in response to receiving the acknowledgement message.

14. The RAN of claim 9, wherein the processing hardware is configured to provide the indication by transmitting, to the UE, a message that includes an explicit release indicator instructing the UE to release the conditional configuration.

15. The RAN of claim 9, wherein:
the processing hardware is configured to provide the indication by providing the indication from a master node (MN); and
the processing hardware is further configured to:
receive, from the MN at a target base station different from the base station to which the conditional configuration is related, the conditional configuration; and
transmit a message from the target base station to the MN, the message including a release indicator indicating that the UE is to release the conditional configuration.

16. A method performed by a user equipment (UE) for processing configuration, the method comprising:
receiving, by the UE and from a source base station operating in a radio access network (RAN), (i) a conditional configuration related to a base station different from the source base station and operating in the RAN, and (ii) a condition to be satisfied before the UE applies the conditional configuration during one of: a conditional secondary node (SN) change, a conditional SN addition, a conditional primary secondary (PScell) change, or a PScell addition;
subsequently to receiving the conditional configuration, receiving, by the UE and from the source base station, an indication that the UE is to unconditionally perform an immediate procedure and release the conditional configuration; and
releasing, by the UE, the conditional configuration in response to the indication.

17. The method of claim 16, wherein receiving the indication includes receiving, from the source base station, a message that includes an instruction and an implicit release indicator instructing the UE to release the conditional configuration.

18. The method of claim 17, wherein receiving the message includes:
receiving a handover command from the source base station.

19. The method of claim 17, where receiving the instruction includes receiving an instruction to reconfigure radio resources.

20. The method of claim 16, wherein releasing the conditional configuration includes releasing a measurement configuration.

* * * * *